United States Patent
Corrigan et al.

(10) Patent No.: US 7,391,973 B1
(45) Date of Patent: Jun. 24, 2008

(54) TWO-STAGE GAIN EQUALIZER

(75) Inventors: Robert W. Corrigan, Sisters, OR (US); Dinesh Maheshwari, Fremont, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 756 days.

(21) Appl. No.: 10/378,027

(22) Filed: Feb. 28, 2003

(51) Int. Cl.
*H01S 3/00* (2006.01)
*G02B 26/00* (2006.01)
*G02F 1/29* (2006.01)
*H04J 14/02* (2006.01)

(52) U.S. Cl. ............................. 398/94; 398/93; 398/78; 398/79

(58) Field of Classification Search ................ 398/50, 398/188–189, 93–94, 78–79
See application file for complete search history.

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Sziklai | 178/5.4 |
| 2,783,403 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |

(Continued)

FOREIGN PATENT DOCUMENTS

EP 0 089 044 A2 9/1983

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Jason Chan
*Assistant Examiner*—Wai Lun Leung
(74) *Attorney, Agent, or Firm*—Okamoto & Benedicto LLP

(57) ABSTRACT

An apparatus for selectively adjusting power levels of component signals of a wavelength division multiplexed signal. The apparatus comprises a first filter and a second filter. The first filter modulates the component signals according to a static attenuation profile, thereby providing coarsely modulated component signals. The second filter is coupled to the first filter to receive the coarsely modulated component signals and to modulate the coarsely modulated component signals according to a dynamic attenuation profile, thereby providing finely modulated component signals.

10 Claims, 12 Drawing Sheets

U.S. PATENT DOCUMENTS

| | | | |
|---|---|---|---|
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,257,053 A | 3/1981 | Gilbreath | |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Spraque et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/79 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe et al. | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |

| | | | |
|---|---|---|---|
| 4,714,326 A | 12/1987 | Usui et al. ............... 350/485 |
| 4,717,066 A | 1/1988 | Goldenberg et al. ........ 228/179 |
| 4,719,507 A | 1/1988 | Bos ......................... 358/92 |
| 4,721,629 A | 1/1988 | Sakai et al. ................. 427/35 |
| 4,722,593 A | 2/1988 | Shimazaki ................ 350/336 |
| 4,724,467 A | 2/1988 | Yip et al. ..................... 355/71 |
| 4,728,185 A | 3/1988 | Thomas .................... 353/122 |
| 4,743,091 A | 5/1988 | Gelbart .................... 350/252 |
| 4,744,633 A | 5/1988 | Sheiman .................. 350/132 |
| 4,747,671 A | 5/1988 | Takahashi et al. .......... 350/336 |
| 4,751,509 A | 6/1988 | Kubota et al. .............. 340/784 |
| 4,761,253 A | 8/1988 | Antes ........................ 264/1.3 |
| 4,763,975 A | 8/1988 | Scifres et al. ........... 350/96.15 |
| 4,765,865 A | 8/1988 | Gealer et al. .............. 156/647 |
| 4,772,094 A | 9/1988 | Sheiman .................... 350/133 |
| 4,797,694 A | 1/1989 | Agostinelli et al. ......... 346/160 |
| 4,797,918 A | 1/1989 | Lee et al. .................... 380/20 |
| 4,801,194 A | 1/1989 | Agostinelli et al. ......... 350/356 |
| 4,803,560 A | 2/1989 | Matsunaga et al. ......... 359/236 |
| 4,804,641 A | 2/1989 | Arlt et al. ................... 437/227 |
| 4,807,021 A | 2/1989 | Okumura ..................... 357/75 |
| 4,807,965 A | 2/1989 | Garakani .................... 350/131 |
| 4,809,078 A | 2/1989 | Yabe et al. .................. 358/236 |
| 4,811,082 A | 3/1989 | Jacobs et al. ................. 357/80 |
| 4,811,210 A | 3/1989 | McAulay ................... 364/200 |
| 4,814,759 A | 3/1989 | Gombrich et al. .......... 340/771 |
| 4,817,850 A | 4/1989 | Wiener-Avnear et al. .... 228/119 |
| 4,824,200 A | 4/1989 | Isono et al. .............. 350/96.16 |
| 4,827,391 A | 5/1989 | Sills ........................... 363/41 |
| 4,829,365 A | 5/1989 | Eichenlaub ................... 358/3 |
| 4,836,649 A | 6/1989 | Ledebuhr et al. ....... 350/331 R |
| 4,856,863 A | 8/1989 | Sampsell et al. .......... 350/96.16 |
| 4,856,869 A | 8/1989 | Sakata et al. ............ 350/162.18 |
| 4,859,012 A | 8/1989 | Cohn ..................... 350/96.24 |
| 4,859,060 A | 8/1989 | Katagiri et al. ............. 356/352 |
| 4,866,488 A | 9/1989 | Frensley ........................ 357/4 |
| 4,882,683 A | 11/1989 | Rupp et al. ................ 364/521 |
| 4,893,509 A | 1/1990 | MacIver et al. .......... 73/517 AV |
| 4,896,325 A | 1/1990 | Coldren ....................... 372/20 |
| 4,896,948 A | 1/1990 | Dono et al. ................ 350/355 |
| 4,897,708 A | 1/1990 | Clements ..................... 357/65 |
| 4,902,083 A | 2/1990 | Wells ......................... 350/6.6 |
| 4,915,463 A | 4/1990 | Barbee, Jr. ................... 350/1.1 |
| 4,915,479 A | 4/1990 | Clarke ....................... 350/345 |
| 4,924,413 A | 5/1990 | Suwannukul .............. 364/521 |
| 4,926,241 A | 5/1990 | Carey .......................... 357/75 |
| 4,930,043 A | 5/1990 | Wiegand .................... 361/283 |
| 4,934,773 A | 6/1990 | Becker ....................... 350/6.6 |
| 4,940,309 A | 7/1990 | Baum ......................... 350/171 |
| 4,943,815 A | 7/1990 | Aldrich et al. ............. 346/108 |
| 4,945,773 A | 8/1990 | Sickafus ................. 73/862.59 |
| 4,949,148 A | 8/1990 | Bartelink .................... 357/74 |
| 4,950,890 A | 8/1990 | Gelbart ................... 250/237 G |
| 4,952,925 A | 8/1990 | Haastert .................... 340/784 |
| 4,954,789 A | 9/1990 | Sampsell ..................... 330/4.3 |
| 4,956,619 A | 9/1990 | Hornbeck .................... 330/4.3 |
| 4,961,633 A | 10/1990 | Ibrahim et al. ............. 350/392 |
| 4,963,012 A | 10/1990 | Tracy et al. ................. 350/641 |
| 4,970,575 A | 11/1990 | Soga et al. .................... 357/72 |
| 4,978,202 A | 12/1990 | Yang ...................... 350/331 R |
| 4,982,184 A | 1/1991 | Kirkwood .................. 340/783 |
| 4,982,265 A | 1/1991 | Watanabe et al. ............. 357/75 |
| 4,984,824 A | 1/1991 | Antes et al. ................... 283/91 |
| 4,999,308 A | 3/1991 | Nishiura et al. ................ 437/4 |
| 5,003,300 A | 3/1991 | Wells ........................ 340/705 |
| 5,009,473 A | 4/1991 | Hunter et al. ................ 350/6.6 |
| 5,013,141 A | 5/1991 | Sakata ....................... 350/348 |
| 5,018,256 A | 5/1991 | Hornbeck ................ 29/25.01 |
| 5,022,750 A | 6/1991 | Flasck ........................ 353/31 |
| 5,023,905 A | 6/1991 | Wells et al. ................. 379/96 |
| 5,024,494 A | 6/1991 | Williams et al. ............ 350/3.6 |
| 5,028,939 A | 7/1991 | Hornbeck et al. .......... 346/160 |
| 5,035,473 A | 7/1991 | Kuwayama et al. .......... 350/3.7 |
| 5,037,173 A | 8/1991 | Sampsell et al. ............. 385/17 |
| 5,039,628 A | 8/1991 | Carey ....................... 437/183 |
| 5,040,052 A | 8/1991 | McDavid ..................... 357/80 |
| 5,041,395 A | 8/1991 | Steffen ...................... 437/206 |
| 5,041,851 A | 8/1991 | Nelson ...................... 346/160 |
| 5,043,917 A | 8/1991 | Okamoto ................... 364/518 |
| 5,048,077 A | 9/1991 | Wells et al. ................... 379/96 |
| 5,049,901 A | 9/1991 | Gelbart ....................... 346/108 |
| 5,058,992 A | 10/1991 | Takahashi .................. 359/567 |
| 5,060,058 A | 10/1991 | Goldenberg et al. .......... 358/60 |
| 5,061,049 A | 10/1991 | Hornbeck ................... 359/224 |
| 5,066,614 A | 11/1991 | Dunnaway et al. .......... 437/209 |
| 5,068,205 A | 11/1991 | Baxter et al. ............... 437/205 |
| 5,072,239 A | 12/1991 | Mitcham et al. ............ 346/108 |
| 5,072,418 A | 12/1991 | Boutaud et al. ........ 364/715.06 |
| 5,074,947 A | 12/1991 | Estes et al. ................ 156/307.3 |
| 5,075,940 A | 12/1991 | Kuriyama et al. .......... 29/25.03 |
| 5,079,544 A | 1/1992 | DeMond et al. ............. 340/701 |
| 5,081,617 A | 1/1992 | Gelbart ....................... 369/112 |
| 5,083,857 A | 1/1992 | Hornbeck ................... 359/291 |
| 5,085,497 A | 2/1992 | Um et al. .................... 359/848 |
| 5,089,903 A | 2/1992 | Kuwayama et al. ........... 359/15 |
| 5,093,281 A | 3/1992 | Eshima ...................... 437/217 |
| 5,096,279 A | 3/1992 | Hornbeck et al. ........... 359/230 |
| 5,099,353 A | 3/1992 | Hornbeck ................... 359/291 |
| 5,101,184 A | 3/1992 | Antes ......................... 235/454 |
| 5,101,236 A | 3/1992 | Nelson et al. ............... 355/229 |
| 5,103,334 A | 4/1992 | Swanberg ................... 359/197 |
| 5,105,207 A | 4/1992 | Nelson ...................... 346/160 |
| 5,105,299 A | 4/1992 | Anderson et al. ........... 359/223 |
| 5,105,369 A | 4/1992 | Nelson ...................... 364/525 |
| 5,107,372 A | 4/1992 | Gelbart et al. .............. 359/824 |
| 5,112,436 A | 5/1992 | Bol .......................... 156/643 |
| 5,113,272 A | 5/1992 | Reamey ....................... 359/53 |
| 5,113,285 A | 5/1992 | Franklin et al. ............. 359/465 |
| 5,115,344 A | 5/1992 | Jaskie ........................ 359/573 |
| 5,119,204 A | 6/1992 | Hashimoto et al. ......... 358/254 |
| 5,121,343 A | 6/1992 | Faris .......................... 395/111 |
| 5,126,812 A | 6/1992 | Greiff .......................... 357/25 |
| 5,126,826 A | 6/1992 | Kauchi et al. ................. 357/72 |
| 5,126,836 A | 6/1992 | Um ............................. 358/60 |
| 5,128,660 A | 7/1992 | DeMond et al. ............. 340/707 |
| 5,129,716 A | 7/1992 | Holakovszky et al. ......... 351/50 |
| 5,132,723 A | 7/1992 | Gelbart ....................... 355/40 |
| 5,132,812 A | 7/1992 | Takahashi et al. ............. 359/9 |
| 5,136,695 A | 8/1992 | Goldshlag et al. ........... 395/275 |
| 5,137,836 A | 8/1992 | Lam ............................. 437/8 |
| 5,142,303 A | 8/1992 | Nelson ...................... 346/108 |
| 5,142,405 A | 8/1992 | Hornbeck ................... 359/226 |
| 5,142,677 A | 8/1992 | Ehlig et al. ................. 395/650 |
| 5,144,472 A | 9/1992 | Sang, Jr. et al. ............. 359/254 |
| 5,147,815 A | 9/1992 | Casto ......................... 437/51 |
| 5,148,157 A | 9/1992 | Florence .................... 340/783 |
| 5,148,506 A | 9/1992 | McDonald ................... 385/16 |
| 5,149,405 A | 9/1992 | Bruns et al. .............. 204/129.1 |
| 5,150,205 A | 9/1992 | Um et al. ...................... 358/60 |
| 5,151,718 A | 9/1992 | Nelson ...................... 346/160 |
| 5,151,724 A | 9/1992 | Kikinis ....................... 357/17 |
| 5,151,763 A | 9/1992 | Marek et al. ................. 357/26 |
| 5,153,770 A | 10/1992 | Harris ........................ 359/245 |
| 5,155,604 A | 10/1992 | Miekka et al. ................. 359/2 |
| 5,155,615 A | 10/1992 | Tagawa ...................... 359/213 |
| 5,155,778 A | 10/1992 | Magel et al. ................. 385/18 |
| 5,155,812 A | 10/1992 | Ehlig et al. ................. 395/275 |
| 5,157,304 A | 10/1992 | Kane et al. .................. 313/495 |
| 5,159,485 A | 10/1992 | Nelson ...................... 359/291 |
| 5,161,042 A | 11/1992 | Hamada ..................... 359/41 |
| 5,162,787 A | 11/1992 | Thompson et al. .......... 340/794 |
| 5,164,019 A | 11/1992 | Sinton ........................ 136/249 |
| 5,165,013 A | 11/1992 | Faris .......................... 395/104 |
| 5,168,401 A | 12/1992 | Endriz ....................... 359/625 |
| 5,168,406 A | 12/1992 | Nelson ...................... 359/855 |
| 5,170,156 A | 12/1992 | DeMond et al. ............. 340/794 |

| | | | |
|---|---|---|---|
| 5,170,269 A | 12/1992 | Lin et al. .................. 359/9 |
| 5,170,283 A | 12/1992 | O'Brien et al. ............ 359/291 |
| 5,172,161 A | 12/1992 | Nelson ...................... 355/200 |
| 5,172,262 A | 12/1992 | Hornbeck ................... 359/223 |
| 5,177,724 A | 1/1993 | Gelbart ................... 369/44.16 |
| 5,178,728 A | 1/1993 | Boysel et al. ............. 156/656 |
| 5,179,274 A | 1/1993 | Sampsell ................. 250/208.2 |
| 5,179,367 A | 1/1993 | Shimizu .................... 340/700 |
| 5,181,231 A | 1/1993 | Parikh et al. .............. 377/26 |
| 5,182,665 A | 1/1993 | O'Callaghan et al. ....... 359/95 |
| 5,185,660 A | 2/1993 | Um ............................. 358/60 |
| 5,188,280 A | 2/1993 | Nakao et al. ............... 228/123 |
| 5,189,404 A | 2/1993 | Masimo et al. ............ 340/720 |
| 5,189,505 A | 2/1993 | Bartelink .................... 257/419 |
| 5,191,405 A | 3/1993 | Tomita et al. .............. 257/777 |
| 5,192,864 A | 3/1993 | McEwen et al. ............ 250/234 |
| 5,192,946 A | 3/1993 | Thompson et al. ......... 340/794 |
| 5,198,895 A | 3/1993 | Vick ........................... 358/103 |
| D334,557 S | 4/1993 | Hunter et al. ............. D14/114 |
| D334,742 S | 4/1993 | Hunter et al. ............. D14/113 |
| 5,202,785 A | 4/1993 | Nelson ...................... 359/214 |
| 5,206,629 A | 4/1993 | DeMond et al. ............ 340/719 |
| 5,208,818 A | 5/1993 | Gelbart et al. ............... 372/30 |
| 5,208,891 A | 5/1993 | Prysner ...................... 358/116 |
| 5,210,637 A | 5/1993 | Puzey ......................... 359/263 |
| 5,212,115 A | 5/1993 | Cho et al. .................. 437/208 |
| 5,212,555 A | 5/1993 | Stoltz ......................... 358/206 |
| 5,212,582 A | 5/1993 | Nelson ...................... 359/224 |
| 5,214,308 A | 5/1993 | Nishiquchi et al. ......... 257/692 |
| 5,214,419 A | 5/1993 | DeMond et al. ............ 340/794 |
| 5,214,420 A | 5/1993 | Thompson et al. ......... 340/795 |
| 5,216,278 A | 6/1993 | Lin et al. |
| 5,216,537 A | 6/1993 | Hornbeck ................... 359/291 |
| 5,216,544 A | 6/1993 | Horikawa et al. .......... 359/622 |
| 5,219,794 A | 6/1993 | Satoh et al. ................. 437/209 |
| 5,220,200 A | 6/1993 | Blanton ...................... 257/778 |
| 5,221,400 A | 6/1993 | Staller et al. ................ 156/292 |
| 5,221,982 A | 6/1993 | Faris ............................ 359/93 |
| 5,224,088 A | 6/1993 | Atiya ........................... 369/97 |
| D337,320 S | 7/1993 | Hunter et al. ............. D14/113 |
| 5,226,099 A | 7/1993 | Mignardi et al. ............ 385/19 |
| 5,230,005 A | 7/1993 | Rubino et al. ............... 372/20 |
| 5,231,363 A | 7/1993 | Sano et al. ................. 332/109 |
| 5,231,388 A | 7/1993 | Stoltz ......................... 340/783 |
| 5,231,432 A | 7/1993 | Glenn ........................... 353/31 |
| 5,233,456 A | 8/1993 | Nelson ...................... 359/214 |
| 5,233,460 A | 8/1993 | Partlo et al. ................. 359/247 |
| 5,233,874 A | 8/1993 | Putty et al. ............. 73/517 AV |
| 5,237,340 A | 8/1993 | Nelson ...................... 346/108 |
| 5,237,435 A | 8/1993 | Kurematsu et al. ........... 359/41 |
| 5,239,448 A | 8/1993 | Perkins et al. .............. 361/764 |
| 5,239,806 A | 8/1993 | Maslakow .................... 53/432 |
| 5,240,818 A | 8/1993 | Mignardi et al. ........... 430/321 |
| 5,245,686 A | 9/1993 | Faris et al. ................. 385/120 |
| 5,247,180 A | 9/1993 | Mitcham et al. .......... 250/492.1 |
| 5,247,593 A | 9/1993 | Lin et al. ..................... 385/17 |
| 5,249,245 A | 9/1993 | Lebby et al. ................. 385/89 |
| 5,251,057 A | 10/1993 | Guerin et al. .............. 359/249 |
| 5,251,058 A | 10/1993 | MacArthur ................. 359/249 |
| 5,254,980 A | 10/1993 | Hendrix et al. .............. 345/84 |
| 5,255,100 A | 10/1993 | Urbanus ..................... 358/231 |
| 5,256,869 A | 10/1993 | Lin et al. .................. 250/201.9 |
| 5,258,325 A | 11/1993 | Spitzer et al. ................ 437/86 |
| 5,260,718 A | 11/1993 | Rommelmann et al. . 346/107 R |
| 5,260,798 A | 11/1993 | Um et al. ................... 358/233 |
| 5,262,000 A | 11/1993 | Welbourn et al. .......... 156/643 |
| 5,272,473 A | 12/1993 | Thompson et al. ............ 345/7 |
| 5,278,652 A | 1/1994 | Urbanus et al. ............ 358/160 |
| 5,278,925 A | 1/1994 | Boysel et al. ................ 385/14 |
| 5,280,277 A | 1/1994 | Hornbeck ................... 345/108 |
| 5,281,887 A | 1/1994 | Engle .......................... 310/335 |
| 5,281,957 A | 1/1994 | Schoolman ................. 345/108 |
| 5,285,105 A | 2/1994 | Cain ............................ 257/672 |
| 5,285,196 A | 2/1994 | Gale, Jr. ..................... 345/108 |
| 5,285,407 A | 2/1994 | Gale et al. .............. 365/189.11 |
| 5,287,096 A | 2/1994 | Thompson et al. .......... 345/147 |
| 5,287,215 A | 2/1994 | Warde et al. ................ 359/293 |
| 5,289,172 A | 2/1994 | Gale, Jr. et al. ............. 345/108 |
| 5,291,317 A | 3/1994 | Newswanger ................ 359/15 |
| 5,291,473 A | 3/1994 | Pauli .......................... 369/112 |
| 5,293,511 A | 3/1994 | Poradish et al. ............. 257/343 |
| 5,296,408 A | 3/1994 | Wilbarg et al. .............. 437/203 |
| 5,296,891 A | 3/1994 | Vogt et al. .................... 355/67 |
| 5,296,950 A | 3/1994 | Lin et al. ...................... 359/9 |
| 5,298,460 A | 3/1994 | Nishiguchi et al. .......... 437/183 |
| 5,299,037 A | 3/1994 | Sakata ......................... 359/41 |
| 5,299,289 A | 3/1994 | Omae et al. ................... 359/95 |
| 5,300,813 A | 4/1994 | Joshi et al. .................. 257/752 |
| 5,301,062 A | 4/1994 | Takahashi et al. .......... 359/567 |
| 5,303,043 A | 4/1994 | Glenn .......................... 348/40 |
| 5,303,055 A | 4/1994 | Hendrix et al. ............. 348/761 |
| 5,307,056 A | 4/1994 | Urbanus ..................... 340/189 |
| 5,307,185 A | 4/1994 | Jones et al. ................... 359/41 |
| 5,310,624 A | 5/1994 | Ehrlich ....................... 430/322 |
| 5,311,349 A | 5/1994 | Anderson et al. ............ 359/223 |
| 5,311,360 A | 5/1994 | Bloom et al. ................ 359/572 |
| 5,312,513 A | 5/1994 | Florence et al. ............. 156/643 |
| 5,313,479 A | 5/1994 | Florence ....................... 372/26 |
| 5,313,648 A | 5/1994 | Ehlig et al. .................. 395/800 |
| 5,313,835 A | 5/1994 | Dunn ........................... 73/505 |
| 5,315,418 A | 5/1994 | Sprague et al. ............... 359/41 |
| 5,315,423 A | 5/1994 | Hong ......................... 359/124 |
| 5,319,214 A | 6/1994 | Gregory et al. ......... 250/504 R |
| 5,319,668 A | 6/1994 | Luecke ....................... 372/107 |
| 5,319,789 A | 6/1994 | Ehlig et al. .................. 395/800 |
| 5,319,792 A | 6/1994 | Ehlig et al. .................. 395/800 |
| 5,320,709 A | 6/1994 | Bowden et al. |
| 5,321,416 A | 6/1994 | Bassett et al. .................. 345/8 |
| 5,323,002 A | 6/1994 | Sampsell et al. .......... 250/252.1 |
| 5,323,051 A | 6/1994 | Adams et al. ............... 257/417 |
| 5,325,116 A | 6/1994 | Sampsell .................... 346/108 |
| 5,327,286 A | 7/1994 | Sampsell et al. ............ 359/561 |
| 5,329,289 A | 7/1994 | Sakamoto et al. ........... 345/126 |
| 5,330,301 A | 7/1994 | Brancher .................... 414/417 |
| 5,330,878 A | 7/1994 | Nelson ....................... 430/311 |
| 5,331,454 A | 7/1994 | Hornbeck ................... 359/224 |
| 5,334,991 A | 8/1994 | Wells et al. ..................... 345/8 |
| 5,339,116 A | 8/1994 | Urbanus et al. ............. 348/716 |
| 5,339,177 A | 8/1994 | Jenkins et al. ................. 359/35 |
| 5,340,772 A | 8/1994 | Rosotker .................... 437/226 |
| 5,345,521 A | 9/1994 | McDonald et al. ............ 385/19 |
| 5,347,321 A | 9/1994 | Gove .......................... 348/663 |
| 5,347,378 A | 9/1994 | Handschy et al. ............ 359/53 |
| 5,347,433 A | 9/1994 | Sedlmayr ................... 362/32 |
| 5,348,619 A | 9/1994 | Bohannon et al. .......... 156/664 |
| 5,349,687 A | 9/1994 | Ehlig et al. .................. 395/800 |
| 5,351,052 A | 9/1994 | D'Hont et al. ................ 342/42 |
| 5,352,926 A | 10/1994 | Andrews .................... 257/717 |
| 5,354,416 A | 10/1994 | Okudaira .................... 156/643 |
| 5,357,369 A | 10/1994 | Pilling et al. ................ 359/462 |
| 5,357,803 A | 10/1994 | Lane ....................... 73/517 B |
| 5,359,349 A | 10/1994 | Jambor et al. ............... 345/168 |
| 5,359,451 A | 10/1994 | Gelbart et al. .............. 359/285 |
| 5,361,131 A | 11/1994 | Tekemori et al. ........... 356/355 |
| 5,363,220 A | 11/1994 | Kuwayama et al. ............ 359/3 |
| 5,365,283 A | 11/1994 | Doherty et al. ............. 348/743 |
| 5,367,585 A | 11/1994 | Ghezzo et al. ................ 385/23 |
| 5,370,742 A | 12/1994 | Mitchell et al. ............. 134/10 |
| 5,371,543 A | 12/1994 | Anderson ................... 348/270 |
| 5,371,618 A | 12/1994 | Tai et al. ....................... 359/53 |
| 5,377,705 A | 1/1995 | Smith, Jr. et al. ........... 134/95.3 |
| 5,382,961 A | 1/1995 | Gale, Jr. ..................... 345/108 |
| 5,387,924 A | 2/1995 | Gale, Jr. et al. ............. 345/108 |
| 5,389,182 A | 2/1995 | Mignardi .................... 156/344 |
| 5,391,881 A | 2/1995 | Jeuch et al. ............. 250/370.09 |
| 5,392,140 A | 2/1995 | Ezra et al. ..................... 359/41 |

| Patent No. | Date | Inventor | Class |
|---|---|---|---|
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/292 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 349/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/77 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,526,834 A | 6/1996 | Mielnik et al. | 134/105 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |

| Patent No. | Date | Inventor | Class |
|---|---|---|---|
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 437/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,269,200 B1 * | 7/2001 | Wickham et al. | 385/15 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,286,231 B1 | 9/2001 | Bergman et al. | 34/410 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,421,179 B1 | 7/2002 | Gutin et al. | 359/572 |
| 6,445,502 B1 | 9/2002 | Islam et al. | 359/571 |
| 6,452,260 B1 | 9/2002 | Corbin et al. | 257/686 |

| | | | |
|---|---|---|---|
| 6,466,354 B1 | 10/2002 | Gudeman | 359/247 |
| 6,480,634 B1 | 11/2002 | Corrigan | 385/4 |
| 6,497,490 B1 | 12/2002 | Miller | 359/614 |
| 6,525,863 B1 | 2/2003 | Riza | 359/290 |
| 6,563,974 B2 | 5/2003 | Riza | 385/18 |
| 6,565,222 B1 | 5/2003 | Ishii et al. | 359/883 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0067887 A1* | 6/2002 | Tomlinson et al. | 385/37 |
| 2002/0071173 A1* | 6/2002 | Lee et al. | 359/337.1 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131228 A1 | 9/2002 | Potter | |
| 2002/0131230 A1 | 9/2002 | Potter | 361/277 |
| 2002/0176151 A1* | 11/2002 | Moon et al. | 359/298 |
| 2002/0195418 A1 | 12/2002 | Kowarz et al. | |
| 2002/0196492 A1* | 12/2002 | Trisnadi et al. | 359/124 |

FOREIGN PATENT DOCUMENTS

| | | |
|---|---|---|
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 686 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1983 |
| GB | 2 296 152 A | 6/1996 |
| GB | 2 319 424 A | 5/1998 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/06297 A3 | 1/2001 |
| WO | WO 01/57581 A3 | 8/2001 |
| WO | WO 02/25348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgaard, "Integrated Semiconductor Light Modulators for Fiber-Optic and Display Applications", Ph.D. Dissertation, Stanford University Feb. 1992.

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69-78.

R. Gerhard-Multhaupt, "Light-Valve Technologies for High-Definition Television Projection Displays", Displays vol. 12, No. 3/4 (1991), pp. 115-128.

O. Solgaard, F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformabable Grating Valve for High Resolution Displays," The 7th International Conference on Solid-State Sensors and Actuators.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Fam et al., "Color Separation by use of Binary Optics," Optics Letters, vol. 18:15 pp. 1214-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.

D. Rowe, "Laser Beam Scanning," SPIE, vol. 2088, Oct. 5, 1993, 18-26.

L. Hornbeck, "Deformable-Mirror Spatial Light Modulators," Spatial Light Modulators and Applications III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269, 1997.

Buhler et al., "Linear Array of Complementary Metal Oxide Semiconductor Double-Pass Metal Micromirrors," Optical Engineering, vol. 36, No. 5, pp. 1391-1398, May 1997.

Gani et al., "Variable Gratings for Optical Switching: Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

Burns, D.M. et al., *Development of microelctromechanical variable blaze gratings*, Sensors and Actuators A, pp. 7-15, 1998.

R.N. Thomas, et al., "The Mirror-Matrix Tube: A Novel Light Valve for Projection Displays", IEEE Transactions on Electron Devices, vol. ED-22, No. 9, pp. 765-775, Sep. 1975.

J. Guldberg, et al., " An Aluminum/Si02/Silicon-on-Sapphire Light Valve Matrix for Projection Displays," Applied Physics Letters, vol. 26, No. 7, pp. 391-393, Apr. 1975.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonics Technology Letters, vol. 9, No. 3, Mar. 1997.pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The Lambdanet Multiwavelength Network: Architecture, Applications, and Demonstrations", IEEE Journal on Selected Areas in Communications, vol. 8, No. 6, Aug. 1990, pp. 995 of 1004.

C. A. Turakatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tuanable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuators Workshop, Hilton Head, South Carolina, Jun. 13-16, 1994.

Sene et al., "Polysilicon micromechnical gratings for optical modulation," Sensors and Actuators, vol. A57, pp. 145-151. 1996.

Amm et al., "Invited Paper: Grating Light Valve™ Technology: Update and Novel Applications," SID Digest, vol. 29, 1998.

Development of Digital MEMS-Based Display Technology Promises Improved Resolution, Contrast, and Speed, XP-000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103-115.

Olga B. Sphan, et al., "High-Optical Power Handling of Pop-Up Microelectromechanical Mirrors", Sandia National Laboratories, IEEE 2000, p. 51-52.

David M. Burns, et al., "Optical Power Induced Damage to Microelectrmechanical Mirrors", Sensors and Actuators A 70, 1998, p. 6-14.

V.S. Aliev et al., "Development of Si(100) surface roughness at the initial stage of etching in F2 XeF2 gases: ellipsometric study," Surface Science 442 (1999), pp. 206-214.

Xuan-Qi Wang et al., "Gas-Phase Silicon Etching with Bromine Trifluoride," Depart. of Electrical Engineering, 136-93 California Institute of Technology, 1997 IEEE, pp. 1505-1508.

Harold F. Winters, "Etch products from the reaction of XeF2 with Si02, Si3N4, SiC, and Si in the presence of Ion Bombardment," IBM Research Laboratory, 1983 American Vacuum Society, pp. 927-931.

F.A. Houle, "Dynamics of SiF4 desorption during etching of silicon by XeF2," J. Chem. Phys. 87 (3), Aug. 1, 1987, pp. 1866-1872.

Mehran Mehregany, "Microelectromechanical Systems," 1993 IEEE, pp. 14-22.

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commerical CMOS Fabricated Integrated Dynamic Thermal Scene Simulator," 1999 IEEE, pp. 29.4.1-29.4.4.

M. Parameswaran et al., "CMOS Electrothermal Microactuators," Depart. of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M. Vugts et al., "Si/XeF2 etching: Temperature dependence," 1996 American Vacuum Society, pp. 2766-2774.

P. Krummenacher et al., "Smart Temperature Sensor in CMOS Technology," Sensors and Actuators, A-21-A-23 (1990), pp. 636-638.

Henry Baltes, "CMOS as sensor technology," Sensors and Actuators A. 37-38, (1993), pp. 51-56.

Thomas Boltshauser et al., "Piezoresistive Membrane Hygrometers based on IC Technology," Sensor and Materials, 5, 3, (1993), pp. 125-134.

Z. Parpia et al., "Modelling of CMOS Compatible High Voltage Device Structures," pp. 41-50.

Jon Gildemeister, "Xenon Difluoride Etching System," 1997, UC Berkeley Micro Tabrication Manual Chapter 7.15, pp. 2-5.

W. Riethmuller et al., "A smart accelerometer with on-chip electronics fabricated by a commerical CMOS process," Sensors and Actuators A. 31, (1992), 121-124.

W. Gopel et al., "Sensors- A Comprehensive Survey," vol. 7, Weinheim New York, 44 pgs.

D. E. Ibbotson et al., "Comparison of XeF2 and F-atom reactions with Si and Si02," 1984 American Institute of Physics, pp. 1129-1131.

D. E. Ibbotson et al., "Plasmaless dry etching of silicon with fluorine-containing compounds," 1994 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching,," Solid State Technology, V. 26, #4, Apr. 1983, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison-Wesley, 2$^{nd}$ edition, 1987, Adelphi University, pp. 163-169.

E. Hecht, "Optics", Addison-Wesley, 2$^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Micromirror Devices™", Tribology Letters, No. 3, pp. 239-247, 1997.

K. W. Goossen et al., "Silicon Modulator Based on Mechanically-Active Anti-Reflection Layer with 1 Mbit/sec Capability for Fiber-in-the-Loop Applications", IEEE Protonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in Al/Si$_3$N$_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 Digest, XP 2020715, pp. 931-933.

F. Sandejas, R. Apte, W. Banyai, and D. Bloom, "Surface Microfabrication of Deformable Grating Valve for High Resolution Displays," The 7$^{th}$ International Conference on Solid-State Sensors and Actuators, Jun. 1993.

Z. Parpia et al., "Modelling of CMOS Compatible High Voltage Device Structures," pp. 41-50, Nov. 1987.

W. Gopel et al., "Sensors- A Comprehensive Survey," vol. 7, Weinheim New York, 44 pgs, 1995.

J. A. Walker et al., "Demonstration of a gain Flattened Optical Amplifier with Micromechanical Equalizer Element", Lucent Technologies, pp. 13-14, 1988.

M. W. Miles, "A New Reflective FPD Technology Using Interferometric Modulation", 4 pgs, May 1997.

F, Sandejas, R. Apte. W. Banyai, and D. Bloom, "Surface Microfabrication of Deformable Grating Valve for High Resolution Displays," The 7$^{th}$ International Conference on Solid-State Sensors and Actuators, Jun. 1993

Z. Parpia, et al., "Modeling of CMOS Compatible High Voltage Device Structure," pp. 41-50, Nov. 1987.

W. Gopel et al., "Sensors—A Comprehensive Survey," vol. 7, Weinheim New York, 44 pgs., 1995.

J.A. Walker, et al., "Demonstration of a Gain Flattened Optical Amplifier with Micromechanical Equalizer Element", Lucent Technologies, pp. 13-14, 1998.

M.W. Miles, "A New Reflective FPD Technology Using Interferometric Modulation", 4 pgs., May 1997.

* cited by examiner

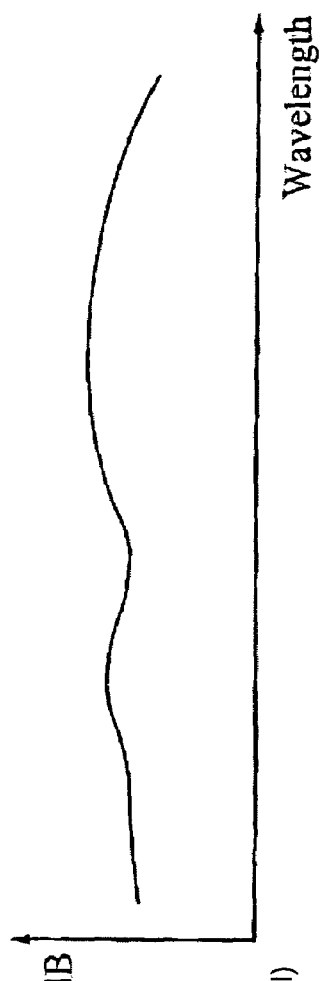
Fig. 1A
(Conventional)
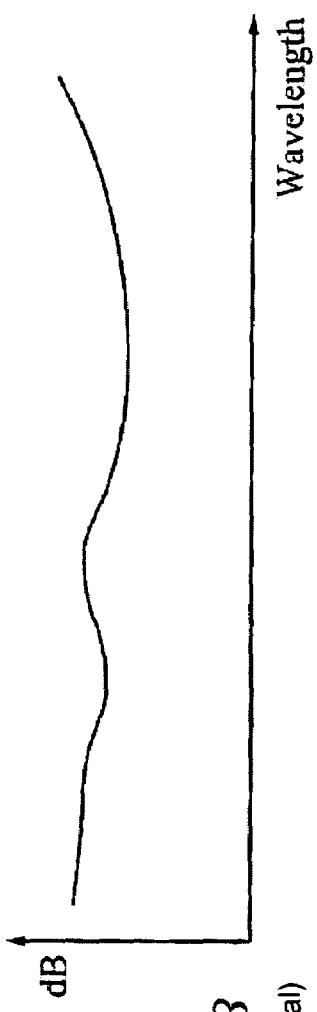
Fig. 1B
(Conventional)
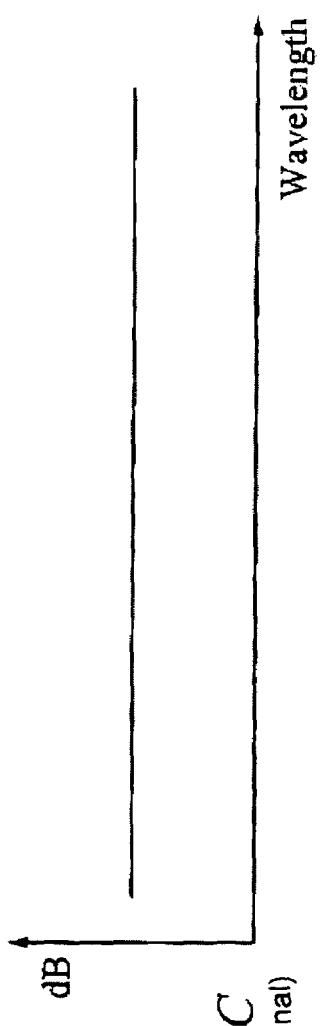
Fig. 1C
(Conventional)

TWO-STAGE GAIN EQUALIZER

FIELD OF THE INVENTION

The present invention relates to a method of and an apparatus for gain equalizing. More particularly, this invention relates to a two-stage gain equalizer including static attenuation and dynamic attenuation.

BACKGROUND OF THE INVENTION

In modem wavelength division multiplexed (WDM) optical transmission systems, there is a need to dynamically equalize the gain of the various data-carrying channels as they pass through the optical network. A large number of factors, including attenuation through the fiber itself, unequal amplification as a function of wavelength as the channels pass through cascaded Erbium Doped Fiber Amplifiers (EDFAs), and others contribute to channel qualities that can degrade the performance and bit-error rate of the system overall. A Dynamic Gain Equalizer (DGE) module equalizes WDM channels or groups of channels to ensure optimal amplification and optical signal-to-noise ratio (OSNR), thus minimizing the bit-error rate (BER) for each channel, while extending transmission distance and expanding usable bandwidth.

Historically, the chief contributor to gain unevenness has been the EDFA. Due to the inherent gain response of the EDFA's operation, there is always a modest imbalance in the gain applied as a function of wavelength. In typical network applications, multiple EDFAs are employed along the total span of the network to boost the signal as it is attenuated through the fiber. As each of the EDFAs imparts a characteristic gain profile to the band, the total unevenness increases in an additive manner. The net result after several EDFAs can be a wholly objectionable power imbalance across the various channels in the band.

In order to compensate for this effect, manufacturers of EDFAs typically insert a static optical element called a Gain Flattening Filter (GFF) into the optical path inside their EDFA modules. A GFF is typically manufactured by depositing a large number of thin films onto a piece of optical glass. The characteristics of the thin films (their thickness and indices of refraction, for example) are carefully selected and controlled during deposition such that they create optical resonances and interferences that effect the transmission of light as a function of wavelength. If properly designed, a GFF can be created in such a way that it completely offsets the effects of the EDFA for a given total input power.

FIGS. 1A-1C illustrate the effect of a GFF attenuation profile on an EDFA gain profile. FIG. 1A illustrates a representation of a gain profile of a typical EDFA. The gain profile indicates how different wavelength signals are attenuated to varying degrees as the signals are impacted by the EDFA. FIG. 1B illustrates an attenuation profile of a typical GFF used to offset the effects of the EDFA imparting the gain profile illustrated in FIG. 1A. Ideally, the attenuation profile of a GFF will be the inverse of the gain profile of a corresponding EDFA. FIG. 1C illustrates the resultant gain of an EDFA with GFF where the EDFA includes the gain profile of FIG. 1A and the GFF includes the attenuation profile of FIG. 1C. A flat resultant gain, as illustrated in FIG. 1C, indicates that the GFF completely offsets the power imbalance effects of the EDFA.

In practice, however, there are a number of factors which render the simple "EDFA plus GFF" formula inadequate. First, while EDFAs have characteristic gain profiles, there can be some manufacturing variability between unit-to-unit and lot-to-lot. The GFFs are even more notoriously difficult to manufacture with consistent performance, due to the large number of different thin films that must be deposited with high repeatability and consistency. Small changes in manufacturing conditions can result in significant changes in performance, making the GFF both expensive and inconsistent. The films on the GFFs can also bleach over their lifetime, rendering them less effective over time. Furthermore, in modern optical networks, where specific optical channels may be frequently dropped or added, there is a need to dynamically effect the gain profile. The profile of the EDFA changes as a result of total power, so as channels are added or dropped, the profile itself changes. A solution that relies wholly upon a static GFF cannot provide adequate flatness to satisfy these changing network requirements.

DGEs have been proposed as a next-generation substitute for GFFs. Because they are variable, they can be configured in the field to optimally flatten a specific set of EDFAs after they are actually powered up. Because they are dynamic, they can respond to changing network conditions as channels are added and dropped.

A number of factors effect the design of the DGE. For example, the DGE should have adequate dynamic range and attenuation slope to flatten the total gain imbalance in the system. Generally, the greater the dynamic range and attenuation slope of the DGE, the greater the number of EDFAs that can be cascaded. As EDFAs are added to lengthen a single optical span, each EDFA adds its characteristic gain imbalance, requiring greater dynamic range and attenuation slope at the DGE for compensation. Thus, there is a rather direct con-elation between the dynamic range and attenuation slope of the DGE and the length of the optical span than can be achieved.

As a practical matter, however, the desire to increase the dynamic range of the DGE can be offset by other factors. For example, it may be more expensive to implement a DGE with wide dynamic range. A DGE that is designed to have a wide dynamic range may induce greater insertion losses when operating in its transparent, or non-attenuation, mode. When operated close to the limit of its dynamic range, a DGE may exhibit degraded performance in terms of polarization dependent losses (PDL), chromatic dispersion or other objectionable effects.

What is needed is a gain equalizer that dynamically attenuates and increases the dynamic range, but does so at a lower cost.

What is needed is a gain equalizer that dynamically attenuates and increases the dynamic range, but does so without significantly increasing deleterious effects such as PDL and insertion loss.

SUMMARY OF THE INVENTION

In one aspect of the present invention, an apparatus selectively adjusts power levels of component signals of a wavelength division multiplexed signal. The apparatus comprises a first filter and a second filter. The first filter modulates the component signals according to a static attenuation profile, thereby providing coarsely modulated component signals. The second filter is coupled to the first filter to receive the coarsely modulated component signals and to modulate the coarsely modulated component signals according to a dynamic attenuation profile, thereby providing finely modulated component signals.

In another aspect of the present invention, a light modulator selectively adjusts power levels of component signals of a wavelength division multiplexed signal. The light modulator comprises a plurality of elements selectively operable in a first mode and a second mode. The plurality of elements are configured to continually apply a predetermined static attenuation profile. When in the first mode, the component signals are modulated according to the static attenuation profile, thereby providing coarsely modulated component signals. When in the second mode, the component signals are modulated according to the static attenuation profile and a dynamic attenuation profile, thereby providing finely modulated component signals.

BRIEF DESCRIPTION OF THE DRAWINGS

FIG. 1A illustrates a representation of a gain profile of a typical EDFA.

FIG. 1B illustrates an attenuation profile of a typical GFF used to offset the effects of the EDFA imparting the gain profile illustrated in FIG. 1A.

FIG. 1C illustrates the resultant gain of an EDFA with GFF where the EDFA includes the gain profile of FIG. 1A and the GFF includes the attenuation profile of FIG. 1C.

DETAILED DESCRIPTION OF THE EMBODIMENTS

The present invention overcomes the aforementioned deficiencies of the background art by providing a two-stage gain equalizer. In a first stage, a static filter comprising a static attenuation profile performs a coarse modulation on a received WDM signal, thereby providing a coarsely modulated WDM signal. Then, in a second stage, a dynamic filter comprising a dynamic gain profile performs a fine modulation on the coarsely modulated WDM signal, thereby providing a finely modulated WDM signal. The dynamic filter preferably includes a dynamic gain equalizer (DGE), and more preferably, the DGE includes a spatial light modulator. Preferably, the spatial light modulator comprises a grating light valve type device (GLV type device). Preferably, the static filter comprises a filter with static GFF-like functionality. In this manner, the two-stage integrated gain equalizer of the present invention first removes a predictable first order unevenness within a given gain profile of the WDM signal, and then fine-tunes the removal of the remaining unevenness utilizing a DGE.

Figure 2:
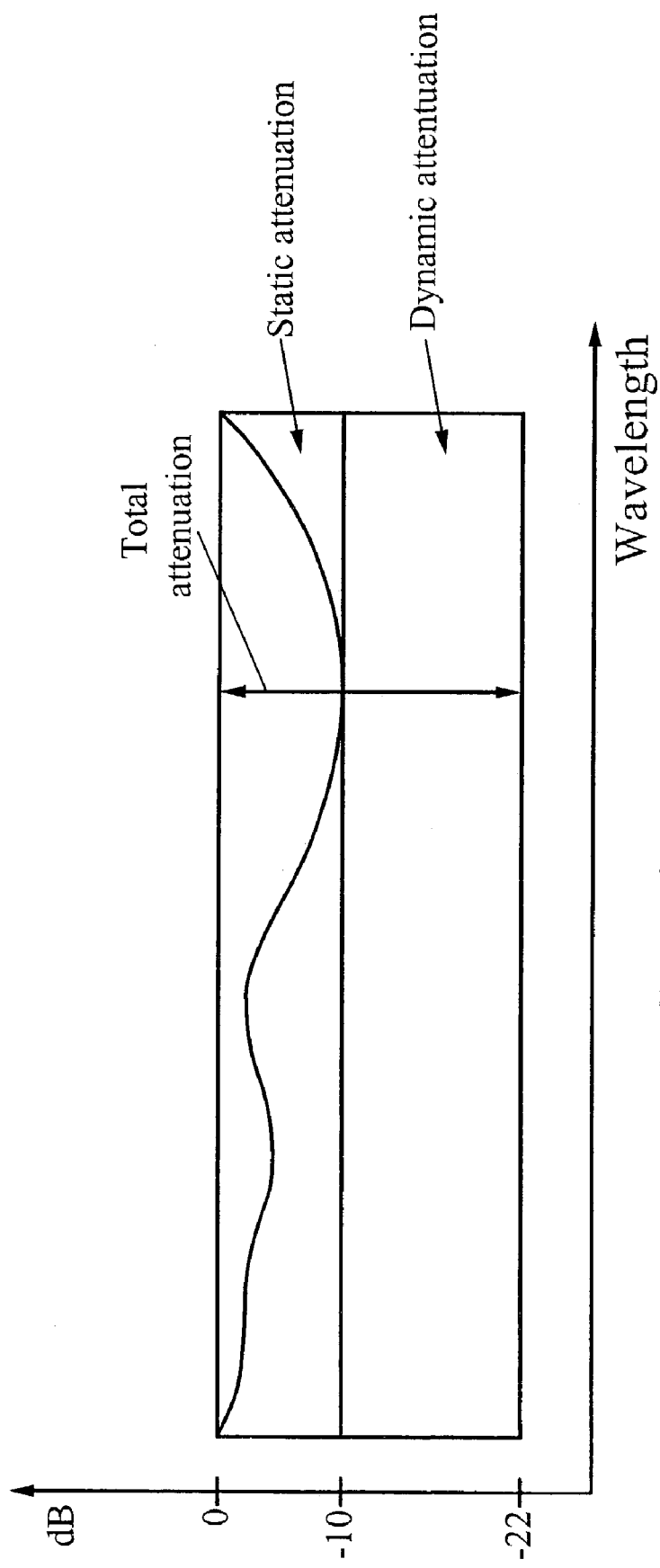
FIG. 2 illustrates the additive effect of an integrated device according to an embodiment of the present invention.

There are a number of advantages of a DGE with integrated GFF functionality. The first advantage is a wider overall gain capability. FIG. 2 illustrates the additive effect of an integrated device according to the embodiments of the present invention. If a static filter has an attenuation range of 10 dB, for example, and a dynamic filter has an attenuation range of 12 dB, then the combined effect can be additive. That is, the combined attenuation range of an integrated static and dynamic filter is 22 dB in this case.

In a practical sense, data collected from various EDFAs indicates a range of potential gain profile curves. In designing the two-stage gain equalizer of the present invention, the most conservative gain profile is considered. The inverse of the most conservative gain profile is used as the attenuation profile of the static filter. This is done because in a best case scenario, at least the attenuation of the most conservative gain profile must be performed in order to obtain gain flattening. In many cases, a given EDFA includes a gain profile showing greater gain than the most conservative gain profile, yet falls within the known range of gain profiles. In this case, the portion of the gain profile that is greater than the most conservative gain profile is attenuated by the dynamic filter of the present invention. In known cases, a given EDFA imparts at least as much gain as the most conservative gain profile. A portion of the gain profile that corresponds to the most conservative gain profile is attenuated statically by the static filter. The remaining portion is attenuated dynamically, which accounts for the variances in the gain profiles for all EDFAs. Although this concept is applied to gain profiles associated with EDFAs, it should be clear that the concept of the present invention can also be applied to gain profiles associated with other types of amplifiers.

Figure 3:
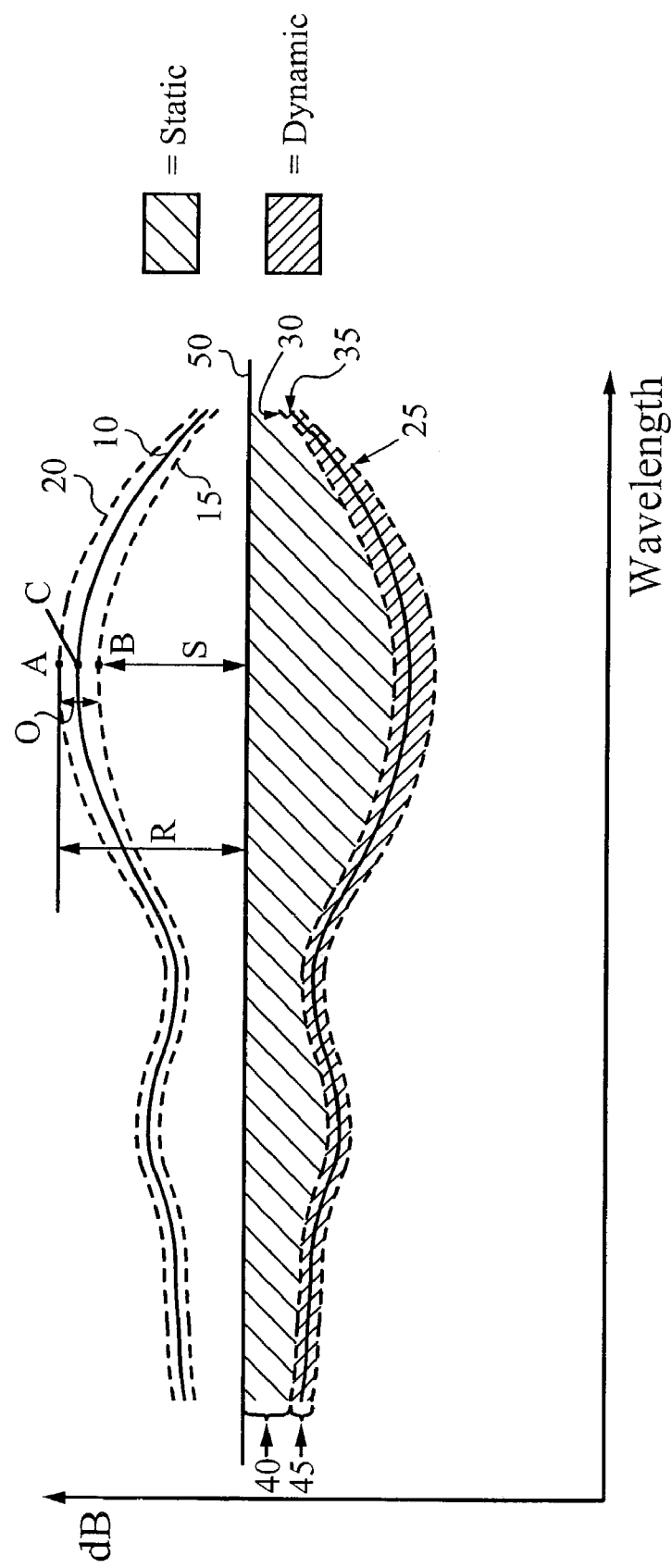
FIG. 3 illustrates an attenuation profile of a two-stage gain equalizer according to an embodiment of the present invention

A second advantage of the two-stage gain equalizer is a higher degree of accuracy provided by the dynamic filter. Instead of combining the ranges of the static and dynamic filters to widen the overall gain capability, the dynamic range of the DGE can be reduced to improve its accuracy. To better illustrate this point, refer to FIG. 3. FIG. 3 illustrates an attenuation profile of a two-stage gain equalizer according to the present invention as it is applied to an exemplary gain profile of a given EDFA. It should be clear that the gain profile illustrated in FIG. 3 is for a random EDFA and that the attenuation profile can be designed to take any required shape depending upon the nature of the amplification device. It should also be clear that although the amplification device is an EDFA, the principles of the present invention can be applied to gain profiles imparted by other amplification devices. The specific gain profile and subsequent explanation of the corresponding attenuation profile as illustrated in FIG. 3 are to aid in understanding and should not limit the scope of the present invention.

A gain profile 10 is a data point for a specific EDFA. As discussed above, a range of gain profiles exists for all known EDFAs. This range includes a most conservative gain profile, or a minimum gain profile 15, and a maximum gain profile 20. As is clear from FIG. 3, the gain profile 10 lies between the minimum gain profile 15 and the maximum gain profile 20. In designing the two-stage gain equalizer, the maximum possible gain must be accounted for in the event that the actual gain profile hits this maximum. This maximum possible gain is represented in FIG. 3 at point A. If a desired resultant gain is represented by a resultant gain 50, then the maximum possible range at point A is range R. Range R is the difference between the gain at point A and the desired resultant gain, at the same wavelength. Within the DGE, there are drive electronics that enable the spatial light modulator to modulate an incident light beam in a step-wise function. The drive electronics essentially take a maximum attenuation corresponding to the maximum possible gain and divides it by a discrete number of steps. If for example, the drive electronics use 8 bits to represent these discrete steps, the number of discrete steps is 256. More or less steps can be designed into the DGE. Where the DGE is to attenuate the entire maximum possible gain, range R, then the size of each discrete step, also known as a step width, is R/256. In general, the larger the step width, the less accurate the DGE is in attenuating a signal to a desired level. In the case where a discrete signal, represented in FIG. 3 at point C, is to be attenuated to the resultant gain 50, a larger step width makes it less likely that the DGE will attenuate the signal exactly to the resultant gain 50. Instead, it is more likely that the closest step is slightly higher or slightly lower than the resultant gain 50.

However, by using a static filter with GFF-like functionality before using the DGE, the DGE will no longer need to attenuate the entire maximum possible gain, range R. By reducing the necessary attenuation range, the step width of the DGE is reduced, thereby improving the attenuation accuracy. The static filter includes a static attenuation profile 30 that approximates the inverse of the minimum gain profile 15. It is a design intent that the static filter attenuates a static portion 40 corresponding to a portion of the gain profile 10 that corresponds to the minimum gain profile 15. Once the static filter is applied, the DGE need only attenuate a dynamic portion 45 that corresponds to a remaining portion of the gain profile 10. It should be clear from FIG. 3 that the entire dynamic portion 45 is only applied when the gain profile 10 is the maximum gain profile 20. In the case where the gain profile 10 is less than the maximum gain profile 20, only a portion of dynamic portion 45 is utilized by the DGE. Since the static filter attenuates a range S corresponding to the minimum gain profile 15, the necessary maximum dynamic attenuation range is no longer range R. Instead, the maximum dynamic attenuation range is range R minus range S, which results in range D. By first using the static filter, the step width of the DGE can be reduced to a range D/256. Since range D is smaller than range R, the step width is reduced. The smaller step width produces finer resolution, which results in improved attenuation accuracy by the DGE. The step width described above is defined in relation to range D, which conforms to the known range of gain profiles for EDFAs. However, it should be clear that the range of the DGE can be smaller or larger than the range D depending on the design specifications of the system.

By first using a static filter, a two-stage gain equalizer can be designed to either increase the overall attenuation range or improve the overall attenuation accuracy. If the intention is to increase the overall attenuation range, then the step width for the DGE remains the same as if the DGE where operating without the static filter. In this case, the attenuation capabilities of the static filter and the dynamic filter are additive and the overall attenuation range is increased. If, on the other hand, the intention is to improve attenuation accuracy, then the step width is reduced, thereby refining the resolution of the DGE. Clearly, there is a trade-off between overall attenuation range and attenuation resolution. Just as clearly, the two-stage gain equalizer of the present invention can be designed to meet any necessary specification that lies between the maximum and minimum values for these trade-offs.

A third advantage of the two-stage gain equalizer is the ability to avoid using the extreme range of the DGE component. The DGE includes the spatial light modulator, preferably a grating light valve type device. Spatial light modulators, and grating light valve type devices in particular, modulate light using diffraction. In a non-attenuating state, the spatial light modulator acts as a flat mirror. In this state, effects due to PDL, insertion loss and others, are minimized. However, once elements of the spatial light modulator are actuated, diffraction occurs. As diffraction increases, so do the deleterious effects associated with PDL. Maximum diffraction, as well as maximum PDL, occurs at the extreme range of the DGE. When designing a DGE, the worst case scenario for PDL must be accounted for in device specifications. So, if by including a static filter the necessary extreme range of the DGE is reduced, then the specifications accounting for PDL, and other deleterious effects that worsen near the extreme end of the range of the device are improved.

For example, if a system includes a 15 dB specification for total dynamic range and the system only includes a DGE, then the entire 15 dB is to be attenuated by the DGE. On the other hand, if a static filter comprising a 5 dB range is first used, then the DGE need only attenuate 10 dB. For the DGE, a 15 dB dynamic range entails a more severe design constraint than a 10 dB dynamic range. So, when a design specification calls for a challenging total dynamic range, there are trade-offs between achieving the total dynamic range and introducing PDL, excessive insertion loss, etc. Therefore, if the dynamic range can be relieved, then other design specifications can be more easily or better achieved.

A fourth advantage of the two-stage gain equalizer is that deleterious effects such as PDL, insertion loss, etc. are more evenly distributed across the wavelength spectrum. Certain effects of the DGE, such as PDL, can be plotted as a function of attenuation. In the case of no attenuation there is typically only a minimal amount of PDL. As attenuation is increased, PDL worsens as some function of a characteristic response. In the case of a DGE, an attenuation profile is applied as a corrective function for a given gain profile. For any portion of the gain profile that has a relatively steep gain-to-wavelength slope, there is a correspondingly steep attenuation-to-wavelength slope of the attenuation profile. For a portion of the attenuation profile that has a steep attenuation-to-wavelength slope, neighboring wavelengths will have significantly different PDL since the neighboring wavelengths experience significantly different attenuations. Similar variances exist for other deleterious effects such as insertion loss, etc. Instead, if a GFF-like static filter is first applied, the slope of the attenuation profile for the DGE is much less steep. This can be seen in FIG. 3. Notice that the dynamic portion 45 has a much more constant range than that of the entire attenuation profile 35. A more constant range leads to a flatter attenuation profile, and therefore a flatter slope, attributable to the DGE. With a flatter slope, neighboring wavelengths experience more similar PDL. As a result, the PDL across the wavelength spectrum is more evenly distributed, which is desirable.

A fifth advantage of the two-stage gain equalizer is that some degree of gain equalizing will occur even in the case of a power failure. A DGE is inoperative during power failure, however, a GFF is not power dependent. Therefore, during loss of power the static attenuation profile is still applied.

A sixth advantage of the two-stage gain equalizer is that the production specifications of the static filter can be relaxed. In an ideal case, the static filter completely predicts the nominal unevenness of the gain profile. If the static filter is used as the sole means for attenuating a given gain profile, then the attenuation profile of the static filter must be precisely manufactured to exactly offset the gain profile. In the case of the two-stage gain equalizer, the attenuation profile of the static filter only needs to be close to completely offsetting the given gain profile, where the dynamic filter can "make up the difference" for any discrepancy.

Figure 4:
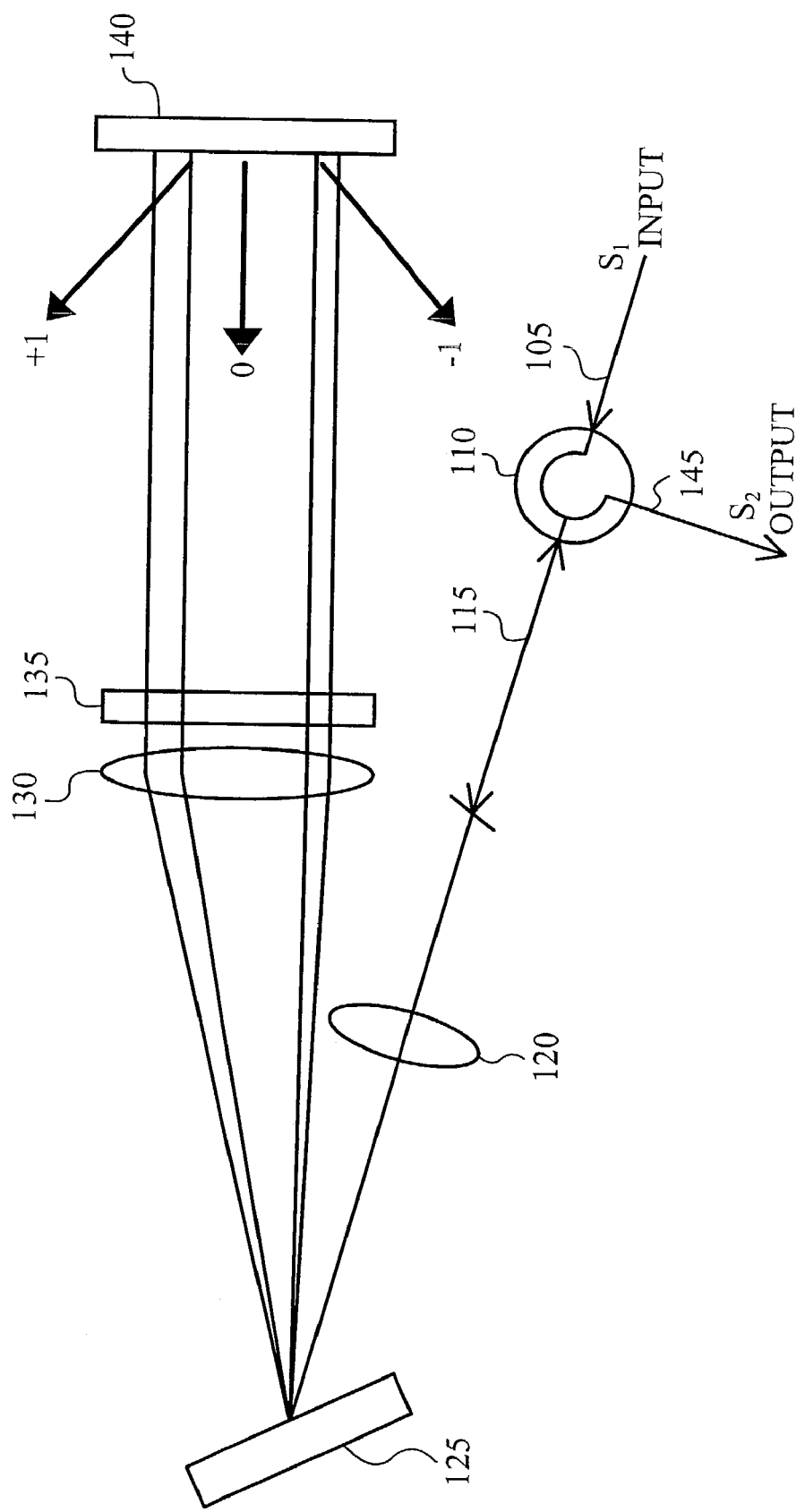
FIG. 4 illustrates a preferred embodiment of the DGE.

Preferably, within the two-stage gain equalizer of the present invention, the dynamic filter is a dynamic gain equalizer (DGE). Such a DGE is described in U.S. application Ser. No. 10/051,972 filed on Jan. 15, 2002, and entitled "METHOD AND APPARATUS FOR DYNAMIC EQUALIZATION IN WAVELENGTH DIVISION MULTIPLEXING" which is hereby incorporated by reference. FIG. 4 illustrates a preferred embodiment of the DGE. A WDM signal S1 entering port 105 of a circulator 110 is output at port 115 to a collimating lens 120. The collimated signal S1 is then transmitted to a bidirectional diffraction grating 125, where component wavelengths $\lambda_1, \ldots, \lambda_n$ of the signal S1 are diffracted at different angles. Although a diffractive grating is preferably used to de-multiplex the signal S1 into component wavelengths $\lambda_1, \ldots, \lambda_n$ alternative means can be used, including but not limited to a prism and a bi-directional de-multiplexor A transform lens 130 maps the component wavelengths $\lambda_1, \ldots, \lambda_n$ onto different positions of a diffractive light modulator 140 via a quarter wave plate 135. Preferably, the diffractive light modulator 140 is a grating light valve type device (GLV type device) array onto which each of the component wavelengths $\lambda_1, \ldots, \lambda_n$ is mapped to a particular grating light valve type device within the grating light valve type device array. The GLV type device array 140 is an addressable dynamic diffraction grating array. By adjusting the amount of diffraction, the reflected power can be controlled accurately over a large dynamic range. The reflected light returns along the same path into port 115 and finally out port 145 via circulator 110 as output signal S2.

Figure 5:
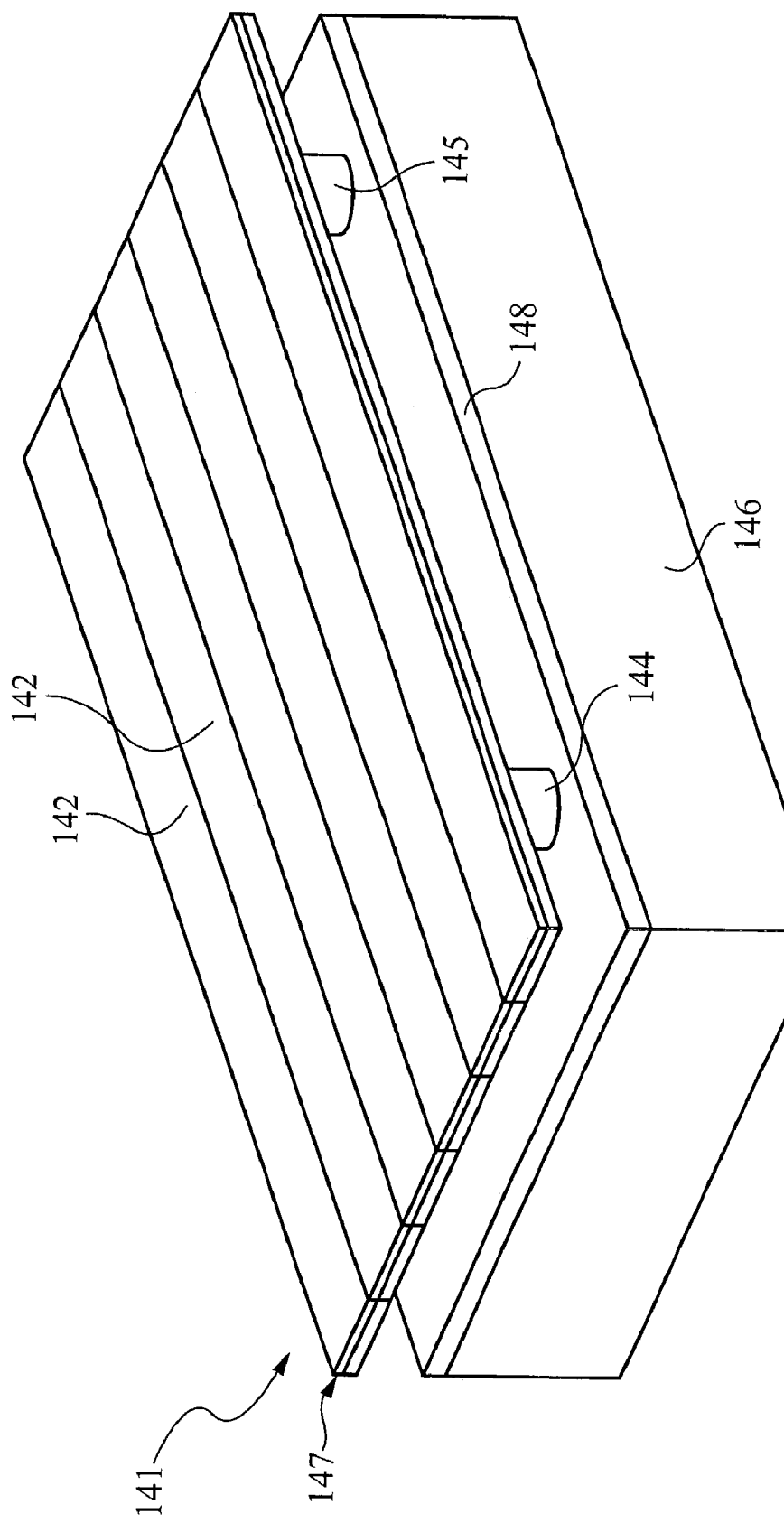
FIG. 5 illustrates a grating light valve type device of the preferred two-stage gain equalizer of the present invention.

A grating light valve type device 141 within the GLV type device array 140 according to one aspect of the embodiments of the present invention is illustrated in FIG. 5. The grating light valve type device 141 preferably comprises elongated elements 142 suspended by first and second posts, 144 and 145, above a substrate 146. The elongated elements 142 comprise a conducting and reflecting surface 147. The substrate 146 comprises a conductor 148. In operation, the grating light valve type device 141 operates to produce modulated light selected from a reflection mode and a diffraction mode.

It will be readily apparent to one skilled in the art that the conducting and reflecting surface 147 can be replaced by a multilayer dielectric reflector in which case a conducting element would also be included in each of the elongated elements 142. Further, it will be readily apparent to one skilled in the art that the conducting and reflecting surface 147 can be coated with a transparent layer such as an anti-reflective layer.

Figure 6:
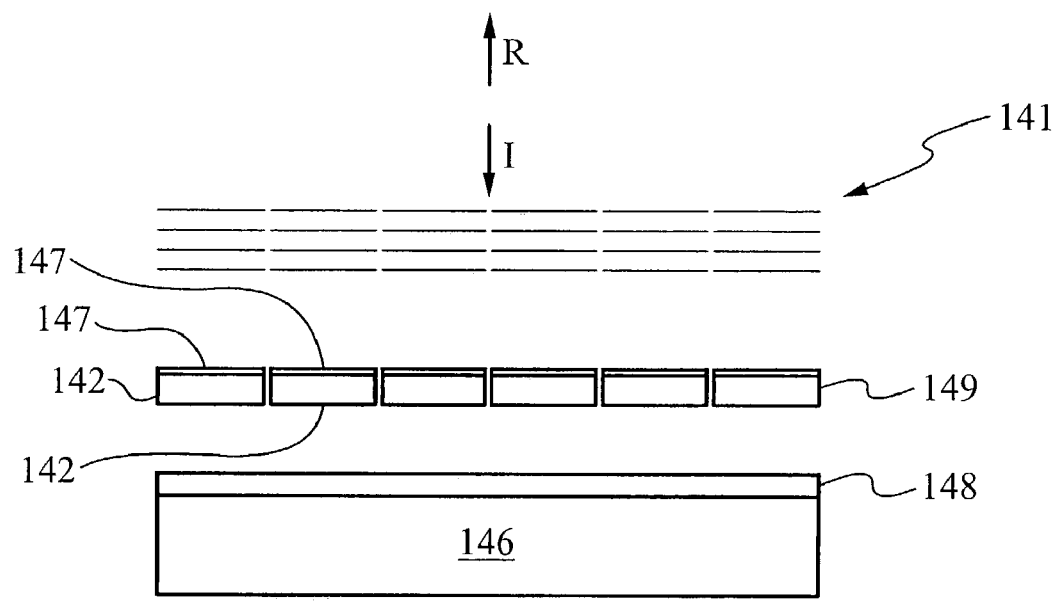
FIG. 6 illustrates a cross-section of the grating light valve type device in a reflection mode.
Figure 7:
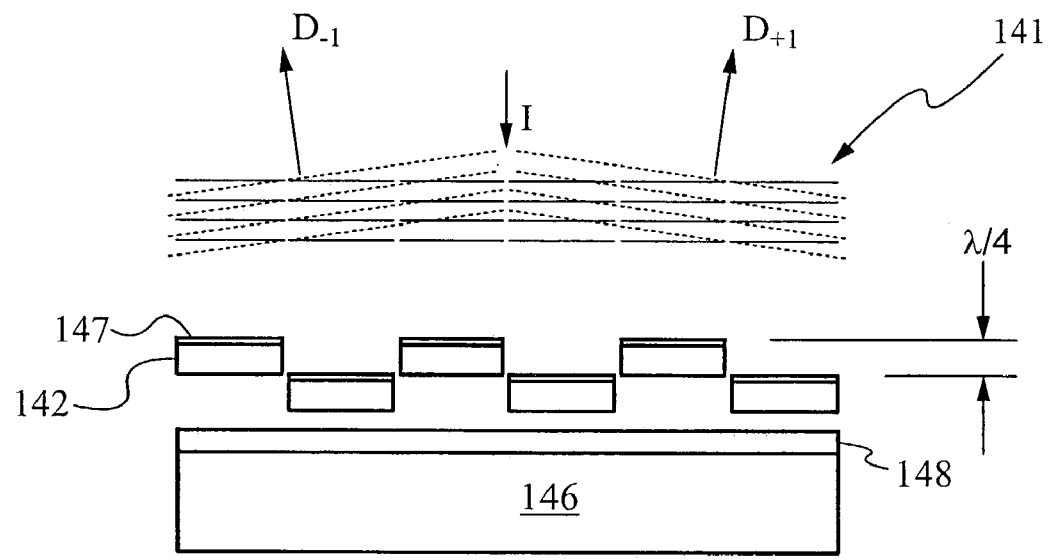
FIG. 7 illustrates a cross-section of the grating light valve type device in a diffraction mode.

FIGS. 6 and 7 illustrate a cross-section of the grating light valve type device 141 in a reflection mode and a diffraction mode, respectively. The elongated elements 142 comprise the conducting and reflecting surface 147 and a resilient material 149. The substrate 146 comprises the conductor 148. In operation, the grating light valve type device 141 operates to produce modulated light selected from a reflection mode and a diffraction mode.

FIG. 6 depicts the grating light valve type device 141 in the reflection mode. In the reflection mode, the conducting and reflecting surfaces 147 of the elongated elements 142 form a plane so that incident light I reflects from the elongated elements 142 to produce reflected light R.

FIG. 7 depicts the grating light valve type device 141 in the diffraction mode. In the diffraction mode, an electrical bias causes alternate ones of the elongated elements 142 to move toward the substrate 146. The electrical bias is applied between the reflecting and conducting surfaces 147 of the alternate ones of the elongated elements 142 and the conductor 148. The electrical bias results in a height difference between the alternate ones of the elongated elements 142 and non-biased ones of the elongated elements 142. A height difference of a quarter wavelength $\lambda/4$ of the incident light I produces maximum diffracted light including plus one and minus one diffraction orders, $D_{+1}$ and $D_{-1}$.

FIGS. 6 and 7 depict the grating light valve type device 141 in the reflection and diffraction modes, respectively. For a deflection of the alternate ones of the elongated elements 142 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements less the quarter wavelength $\lambda/4$, the grating light valve type device 141 produces a variable reflectivity. By varying the reflectivity in this manner, each wavelength can be equalized as desired. It should be born in mind that terms like "equalize" and "equalization" as used with respect to embodiments of the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies.

While FIGS. 6 and 7 depict the grating light valve type device 141 having six of the elongated elements 142, the grating light valve type device 141 preferably includes more of the elongated elements 142. By providing more of the elongated elements 142, the elongated elements 142 are able to function as groups, which are referred to as pixels. Preferably, the pixels are groups of six of the elongated elements 142. Alternatively, the pixels are groups of more or less elongated elements 142.

It will be readily apparent to one skilled in the art that the term "pixel" is used here in the context of an element of a light modulator rather than its more common definition of a picture element of a display.

Referring back to FIG. 4, as each of the component wavelengths $\lambda_1, \ldots, \lambda_n$ interact with the GLV type device array 140, they experience diffraction. A benefit of diffraction is that a certain amount of light is "thrown away" from the central path. In this manner, the light mapped onto the GLV type device array 140 is dynamically attenuated by the performance of the GLV type device array 140. As each wavelengths $\lambda_1, \ldots, \lambda_n$ impinges the GLV type device array 140, the grating light valve type device corresponding to each particular wavelength causes all, some, or none of the of the impinging light to diffract. In essence, each of the component wavelengths $\lambda_1, \ldots, \lambda_n$ is dynamically equalized by discarding all, some, or none of the signal by diffraction. As the elongated elements of a grating light valve type device are deflected, the light mapped to that grating light valve type device is diffracted by an amount corresponding to the distance that the elongated elements are deflected, resulting in only a portion of the component wavelength being reflected. When the elongated elements are not deflected, none of the impinging light is diffracted and the entire component wavelength is reflected. Through this process, each reflected component wavelength is dynamically equalized.

The attenuating function of the GLV type device array 140 can have any arbitrary shape along the array. The attenuating function can be a smoothly varying arbitrary shape, a passband filter for one or more channels, or any other desired function. A given attenuation function of the DGE is herein referred to as an attenuation profile.

Figure 8:
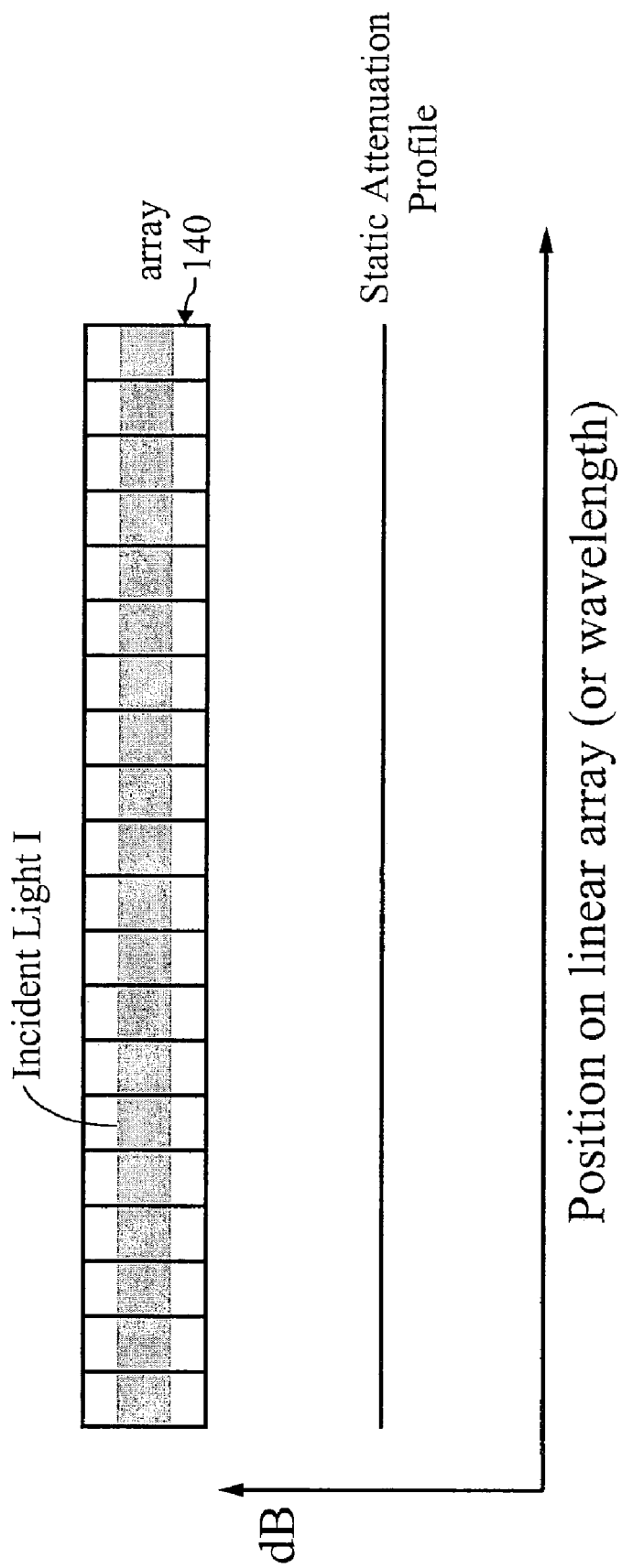
FIG. 8 illustrates a top-down view of the grating light valve array of FIGS. 5-8 and its corresponding attenuation profile.

FIG. 8 illustrates a top-down view of the GLV type device array 140 along with its non-actuated attenuation profile. The non-actuated attenuation profile is also referred to as a static attenuation profile. Non-actuating indicates that the GLV type device array 140 is in the reflection mode, or mirror-state. In other words, the static attenuation profile shown in FIG. 8 illustrates the GLV type device array 140 acting as a static filter. The flat resultant output of the static attenuation profile illustrated in FIG. 8 indicates that the GLV type device array 140 does not attenuate the impinging light while in a static mode.

FIGS. 9-13 illustrate various embodiments of the two-stage gain equalizer of the present invention. Each of the embodiments are described as including a linear GLV type device as the dynamic attenuating element. It is readily perceived that other types of spatial light modulators can easily be substituted for the GLV type device, and the same concepts still apply. The static attenuation profiles illustrated in each of the FIGS. 10-13 are for illustrative purposes only and are not intended to limit the scope of the present invention.

Figure 9:
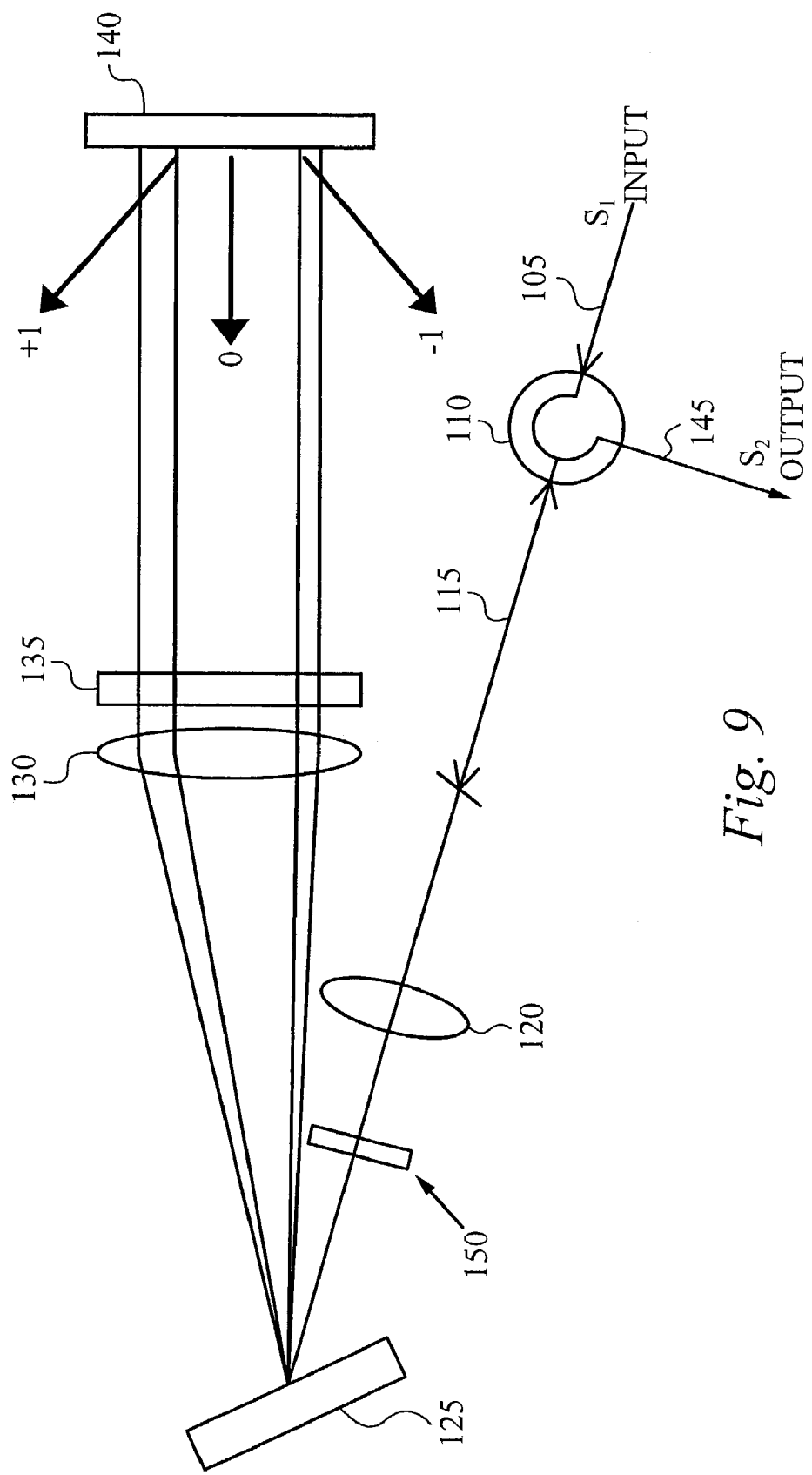
FIG. 9 illustrates a first embodiment of the two-stage gain equalizer according to the present invention and its corresponding attenuation profile.

FIG. 9 illustrates a first embodiment of the two-stage gain equalizer according to the present invention. A static filter 150 is inserted into the optical path of the DGE illustrated in FIG. 4. Preferably, the static filter 150 is a GFF, although any static filter including GFF-like functionality can be used. The static filter 150 is preferably positioned between the collimating lens 120 and the diffraction grating 125 so that the static filter 150 receives collimated light. Alternatively, the static filter 150 can be positioned anywhere within the optical train illustrated in FIG. 9. Since the static filter 150 is used in conjunction with a DGE, normal tolerances for thin-film optical GFFs need not be observed, thereby lowering the cost of the GFF element. Because the static filter 150 can be readily inserted into the sealed environment of a pre-existing DGE package, the overall cost of adding the static filter 150 to the system can also be reduced.

Figure 10:
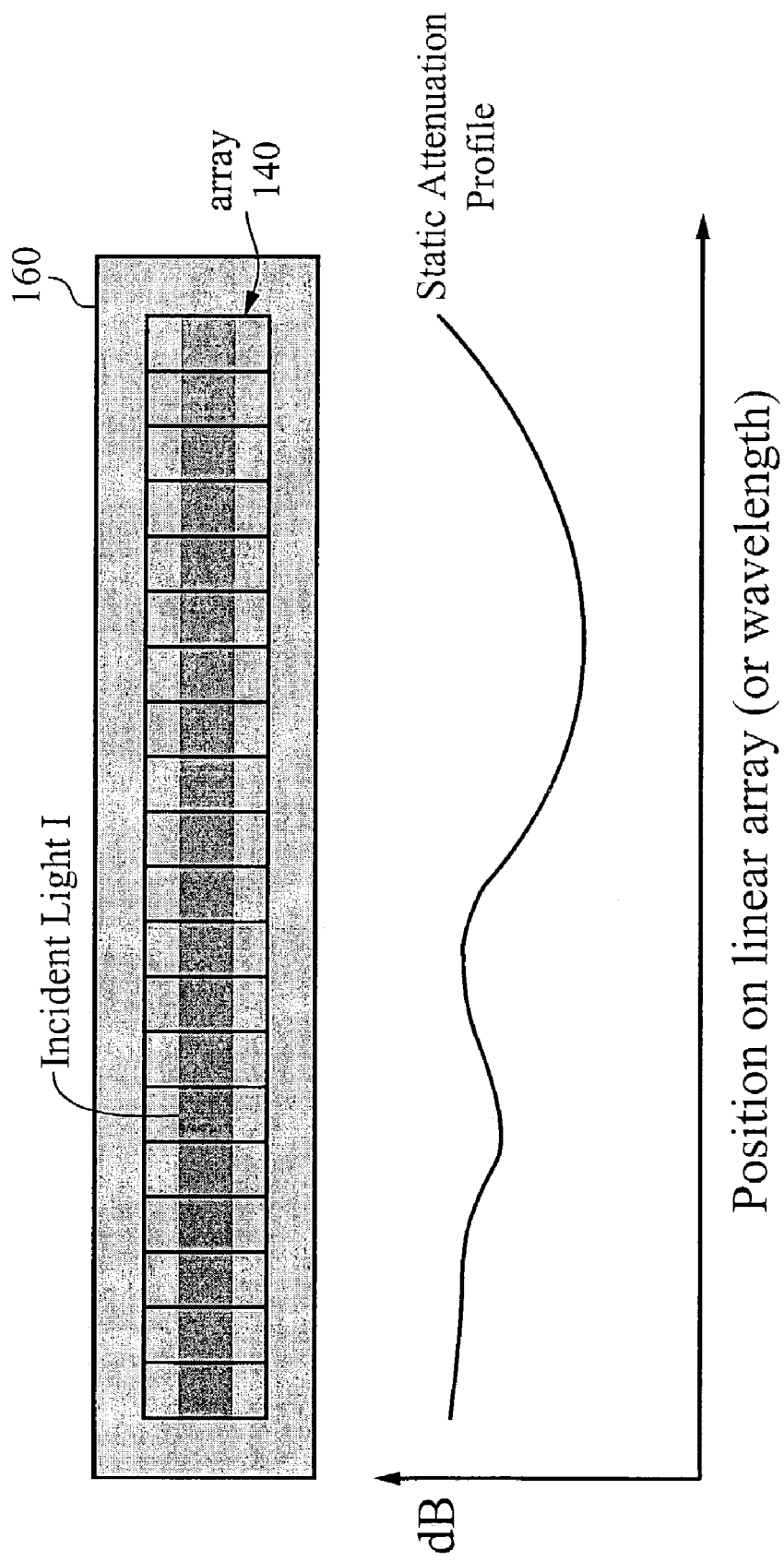
FIG. 10 illustrates a second embodiment of the two-phase gain equalizer of the present invention and its corresponding attenuation profile.

FIG. 10 illustrates a second embodiment of the two-phase gain equalizer of the present invention. Instead of inserting the static filter 150 as in FIG. 9, a static filter 160 is used as a lid that hermetically seals the GLV type device array 140. Preferably, the static filter 160 is a GFF, although any static filter including GFF-like functionality can be used. The GLV type device array 140 illustrated in FIG. 4 includes a transparent glass lid comprising anti-reflection coatings. In the second embodiment, a stack of thin-film coatings is applied to the glass lid before the glass lid is sealed onto the GLV type device array 140. In this manner, the glass lid with thin-film coatings acts as a GFF. As in the first embodiment, tolerances on the optical GFF element are reduced, so costs can also be reduced. By integrating the GFF with the GLV type device array, this second embodiment has one less optical component in the system than the first embodiment. This reduces cost and complexity since the GFF no longer needs to be mounted and aligned as a separate optical element. The static attenuation profile of the second embodiment is illustrated in FIG. 10. The static attenuation profile is determined while the GLV type device array 140 is non-actuated. Therefore, the static portion of the resultant output attributable to the GLV type device array 140 is the same as that illustrated in FIG. 8.

So the static attenuation profile in FIG. 10 can be solely attributable to the static filter 160.

Figure 11:
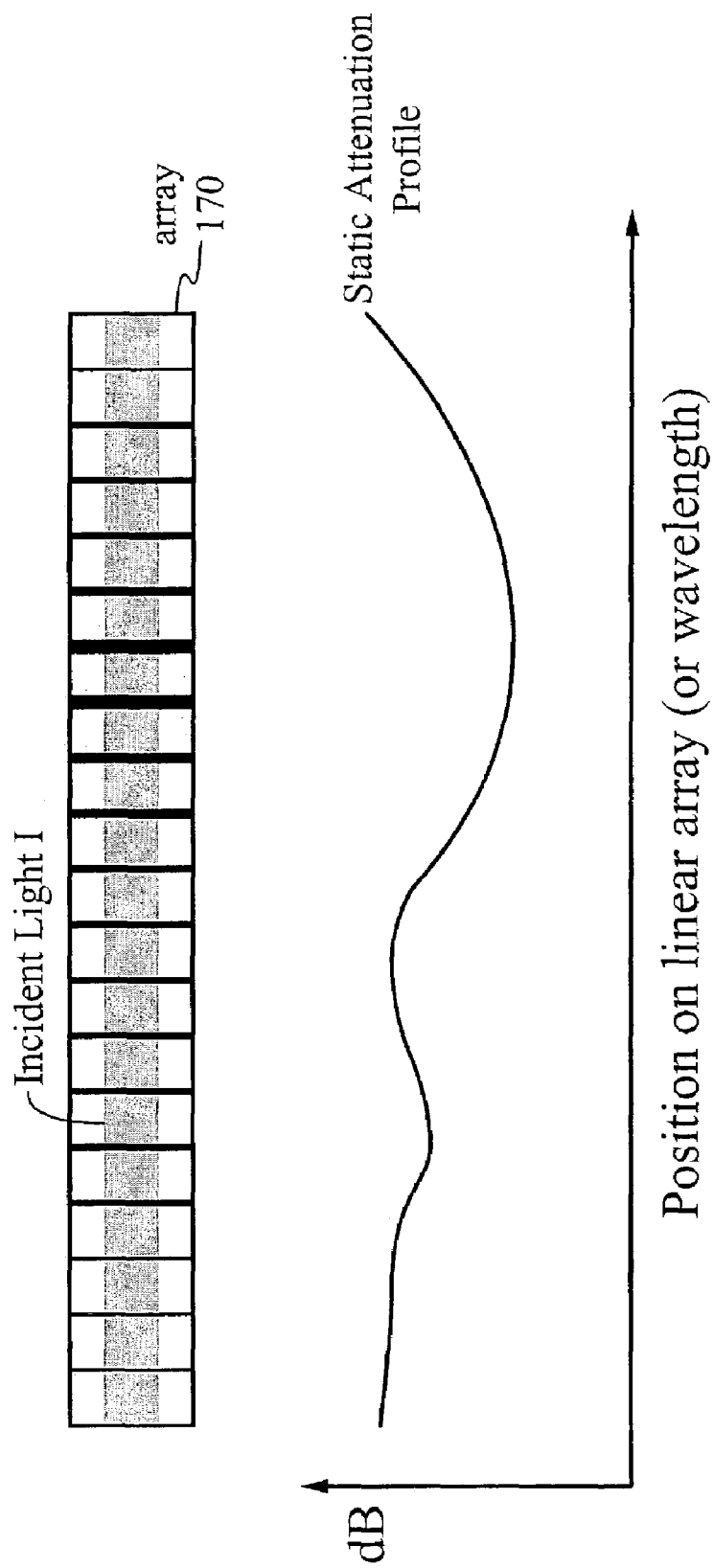
FIG. 11 illustrates a third embodiment of the two-phase gain equalizer of the present invention and its corresponding attenuation profile.

FIG. 11 illustrates a third and preferred embodiment of the two-stage gain equalizer of the present invention. A GLV type device array 170 is designed to impart a static and dynamic attenuation profile. In the third embodiment, the GLV type device array 170 replaces the GLV type device array 140 and static filter 150 of the first embodiment and replaces the GLV type device array 140 and the static filter 160 of the second embodiment. In the GLV type device array 170, the gaps between the GLV type device ribbons, or elements, are varied as a means to produce a static attenuation profile that can be varied along the length of the array. As the gaps are widened, the width of the adjacent ribbon is narrowed by a corresponding amount. This effect can be seen in FIG. 11. As described herein, an increase or decrease in the gap width indicates a corresponding decrease or increase in the adjacent ribbon width, respectively. The gaps are specified as part of the GLV type device manufacturing process. As such, the static attenuation profile that results from the varied gap widths is a fixed characteristic of the GLV type device array. By varying the gaps between the GLV type device elements, the GLV type device array 170 imparts the static, or fixed, attenuation profile without actuating the elements of the GLV type device array 170. This static attenuation profile is illustrated in FIG. 11. The wider the gaps, the larger the attenuation. Although the GLV type device array 170 illustrated in FIG. 11 indicates that the gaps between adjacent GLV type device ribbons are varied, this is also meant to indicate that the gaps between the elements within a specific GLV type device pixel or minimum addressable element are also varied. Preferably, all gaps between elements in the same GLV type device addressable element are the same. Alternatively, the gaps between elements in the same GLV type device addressable element can also be varied to further refine the attenuation profile.

Photolithography is used to produce the varied gap widths. In contrast, GFF-like static filters are produced by depositing thin-film optical coatings. Such thin-films are difficult to manufacture within specifications and they tend to bleach over time. Using photolithography tightens control and repeatability. Including the GFF-like functionality within the design of the GLV type device reduces cost and increases the useful life of the device. There is no incremental cost penalty associated with fabricating the device using photolithography, and the additional GFF-like static filter is removed.

Accurate design of the GLV type device must take into account reflectivity of the base at each of the gaps. While attenuation does increase as the gap widens, there is a limit. If the gap is increased to its maximum, which correlates to a GLV type device ribbon width of zero, the Fresnal reflection from the base is approximately 30%. The use of dielectric layers, diffraction structures, etc. can be used to better suppress the reflection. Considering the negative attenuation effects due to base reflectivity and that there is a maximum achievable attenuation, varying the gap width may not produce enough attenuation to optimally meet the minimum static attenuation profile. In this case, the dynamic range of the DGE can be increased to compensate for the shortfall of the static attenuation profile.

For the GLV type device array 170 illustrated in FIG. 11, widening the gaps alters PDL effects across the GLV type device array. For applications that are PDL sensitive, the GLV type device array 170 can be altered to greatly minimize these PDL effects. Instead of the ribbons being linear, the ribbons are cut as curved surfaces, in a serpentine-like pattern. Since the ribbons form a serpentine pattern, so do the gaps. These serpentine gaps can be varied in width similarly to the gap widths in the GLV type device array 170 illustrated in FIG. 11. In this manner, the serpentine gap widths can be varied to achieve a desired static attenuation profile while also minimizing PDL effects.

The concept of varying gap width to produce a static attenuation profile can be broadened beyond GLV type devices. Any type of physical media performing dynamic attenuation where excess insertion losses are produced as a function of its operation can vary the element that causes the excess insertion loss to create a static attenuation profile. In the case of the GLV type device, the gaps lead to excess insertion loss. This concept can also be used in LCDs that have cell gaps between each LCD, to MEMS mirrors that have gaps between the mirrors, and other types of similar devices.

Figure 12:
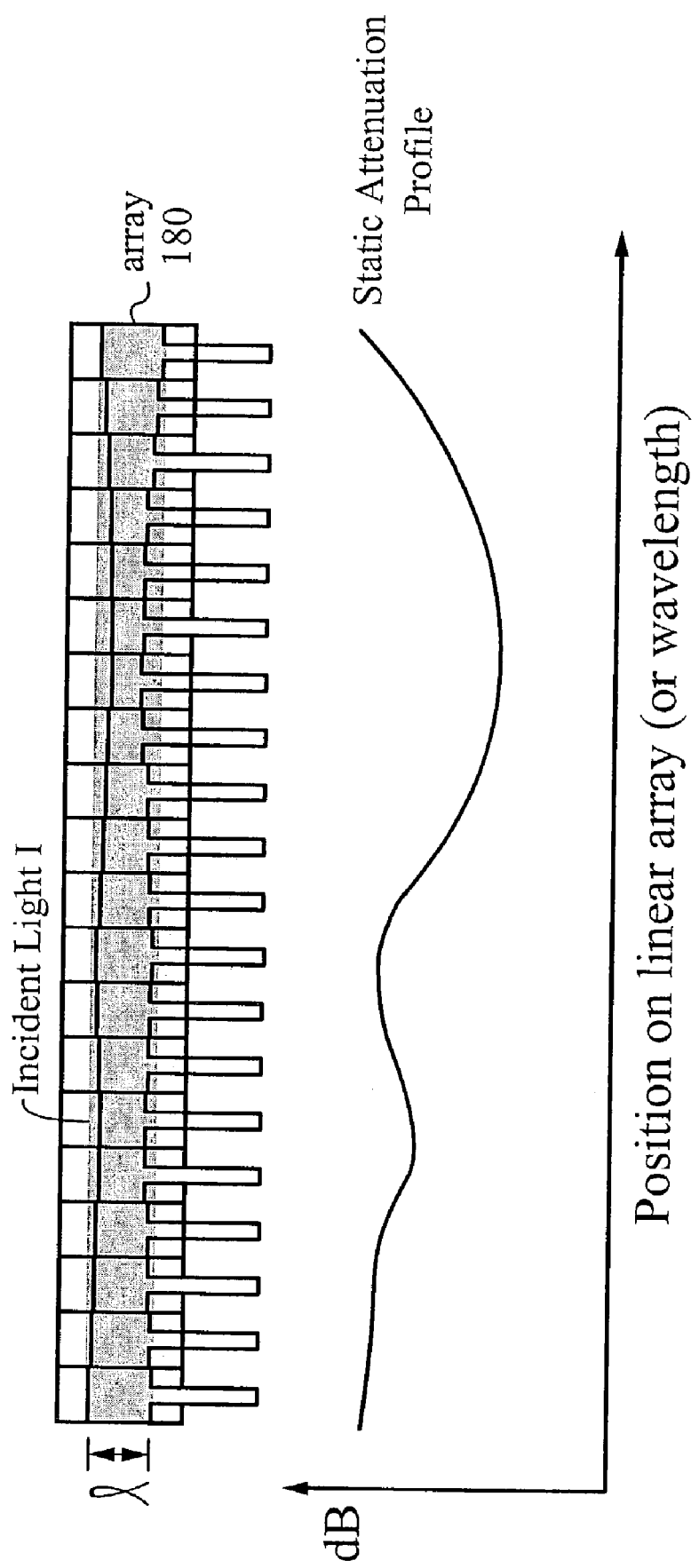
FIG. 12 illustrates a fourth embodiment of the two-phase gain equalizer of the present invention and its corresponding attenuation profile.

FIG. 12 illustrates a fourth embodiment of the two-stage gain equalizer of the present invention. Similar to the third embodiment, a GLV type device array 180 is designed to impart a static and dynamic attenuation profile. In the fourth embodiment, the GLV type device array 180 replaces the GLV type device array 140 and either the static filter 150 or 160 of the first or second embodiments, respectively. In contrast to the GLV type device array 170, the gaps between the GLV type device ribbons of the GLV type device array 180 are constant, but the amount of reflective coating on each GLV type device ribbon is varied as a means to produce an attenuation profile that can be varied along the length of the array. The reflective layer which overcoats each of the GLV type device ribbons is patterned in such a way that it only reflects a portion of the incident light. By changing the coverage of the reflective coating that is applied to each GLV type device ribbon, the degree of attenuation of the element, or ribbon, can be varied along the length of the GLV type device array 180. Although the GLV type device array 180 illustrated in FIG. 12 indicates that the amount of reflective coating on each of the adjacent GLV type device ribbons is varied, this is also meant to indicate that the amount of reflective coating on each of the elements within a specific GLV type device pixel or minimum addressable element are also varied. Preferably, the amount of reflective coating on each of the elements in the same GLV type device addressable element are the same. Alternatively, the amount of reflective coating on each of the elements in the same GLV type device addressable element can also be varied to further refine the attenuation profile.

The reflective layer patterns are specified as part of the GLV type device manufacturing process. As such, the static attenuation profile that results from the varied reflective layer patterns is a fixed characteristic of the GLV type device array. By varying the length l of the reflective layers on the GLV type device elements, as illustrated in FIG. 12, the GLV type device array 180 imparts a static, or fixed, attenuation profile without actuating the elements of the GLV type device array 180. This static attenuation profile is illustrated in FIG. 12. In the previous embodiments, the reflective layer on each GLV type device of the GLV type device arrays 140 and 170 sufficiently covers the length of each ribbon such that the entire incident light impinges the reflective layer. In the GLV type device array 180, the length l of the reflective layer on each ribbon is patterned such that the reflective area on each ribbon receives all or only a portion of the incident light. The effective reflective area is altered geometrically to configure to the desired static attenuation of the incident light. The more reflective area on the ribbon means more of the incident light is reflected, thereby limiting the degree of attenuation. The less reflective area on the ribbon means less of the incident light is reflected, which leads to greater attenuation. By varying the reflective area on the ribbons, a desired static attenuation profile is achieved.

Similar to the third embodiment, varying the reflective area on each ribbon is performed using photolithography. As above, this approach introduces no additional costs, and eliminates the GFF-like static filter. Tighter calibration specifications are necessary to ensure proper optical alignment of the incident light on the GLV type device array. Alignment of the incident light can be achieved using active alignment with feedback.

Figure 13:
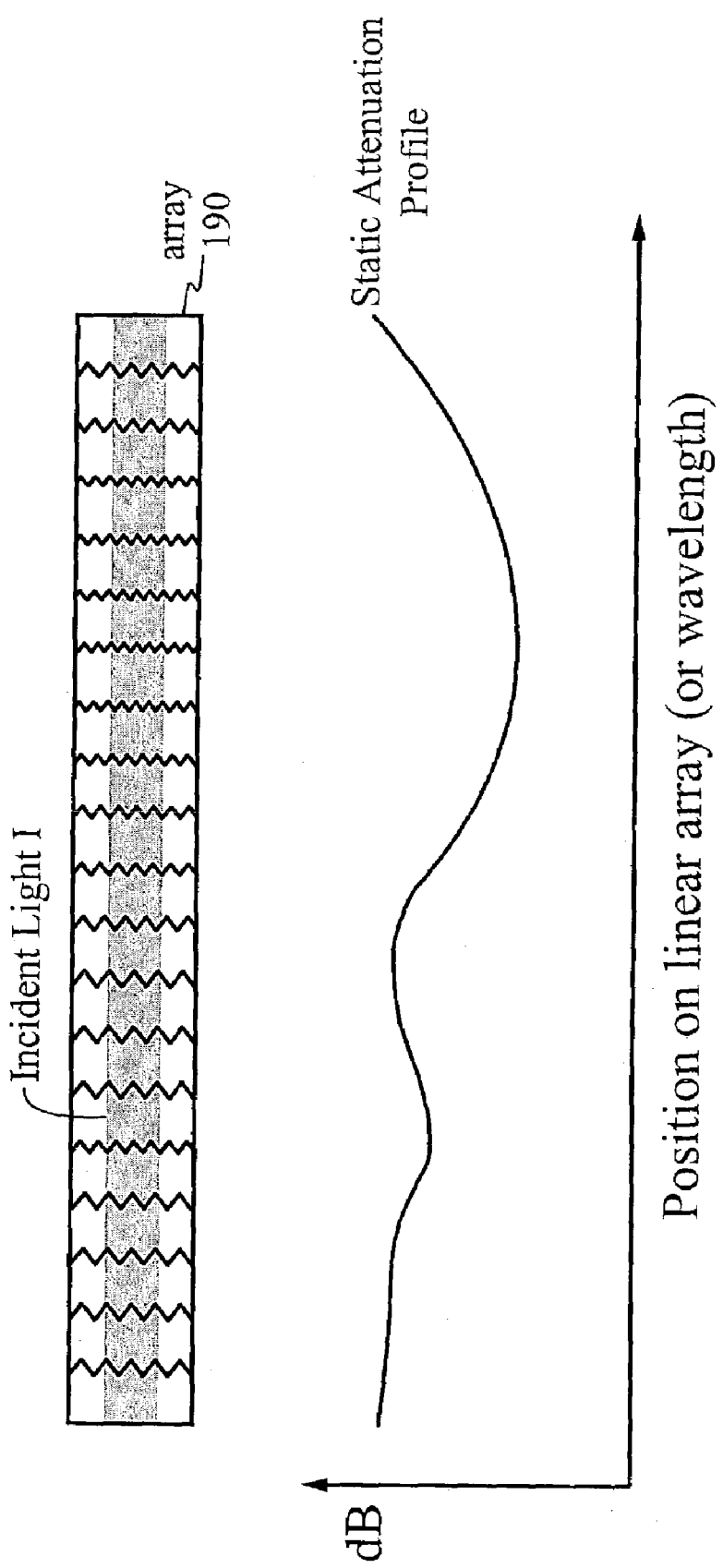
FIG. 13 illustrates a fifth embodiment of the two-phase gain equalizer of the present invention and its corresponding attenuation profile.

FIG. 13 illustrates a fifth embodiment of the two-stage gain equalizer of the present invention. Similar to the third and fourth embodiments, a GLV type device array 190 is designed to impart a static and dynamic attenuation profile. In the fifth embodiment, the GLV type device array 190 replaces the GLV type device array 140 and either the static filter 150 or 160 of the first or second embodiments, respectively. In contrast to the GLV type device arrays 170 and 180, the gaps between the GLV type device ribbons and the reflective area on each ribbon of the GLV type device array 190 are constant, but the edges of each ribbon are serrated as a means to produce an attenuation profile that can be varied along the length of the array. Although the GLV type device array 190 illustrated in FIG. 13 indicates that the serration frequency between adjacent GLV type devices is varied, this is also meant to indicate that the serration frequency between the elements within a specific GLV type device are also varied. Preferably, all serration frequencies between elements in the same GLV type device are the same. Alternatively, the serration frequency between elements in the same GLV type device can also be varied to further refine the attenuation profile.

As can be seen in FIG. 13, the edges between ribbons is cut in such a way that light is diffracted at angles 45 degrees away from the long axis of the GLV type device array 190. By changing the pitch of the edge serrations, the magnitude of the light that is diffracted out of an optical collection system can be varied, thereby changing the attenuation along the length of the array. In other words, by changing the frequency of the serrations, the amount of light that is diffracted, and therefore collected, is changed. The higher the serration frequency, the greater the attenuation, as illustrated by the static attenuation profile in FIG. 13.

As with the third and fourth embodiments, the fifth embodiment is achieved using photolithography which comes without penalties of cost or additional optical elements. The GLV type device array 190 includes a further advantage of being symmetrical in the X-axis and the Y-axis of the array, thereby avoiding introduction of any problems with PDL that can arise when the two orthogonal polarizations are effected differently.

It will be readily apparent to one skilled in the art that other various modifications may be made to the preferred embodiment without departing from the spirit and scope of the invention as defined by the appended claims.

We claim:

1. An apparatus for selectively adjusting power levels of component signals of a wavelength division multiplexed (WDM) signal, the apparatus comprising:
    a circulator configured to receive the WDM signal via a first port and outputting the WDM signal via a second port;
    a collimating lens configured to receive the WDM signal from the circulator and to collimate the WDM signal;
    a first filter for receiving the WDM signal from the collimating lens and for modulating the component signals according to a static attenuation profile, thereby providing coarsely modulated component signals, wherein the static attenuation profile includes a predetermined function in which attenuation varies as a function of the wavelength of the component signal;

a de-multiplexing device configured to receive the coarsely-modulated component signals from the first filter and for diffracting the coarsely-modulated component signals at different angles;

a transform lens configured to receive the diffracted coarsely-modulated signals from the de-multiplexing device and to map the coarsely-modulated signals onto different positions in a plane; and a second filter configured in the plane to receive the coarsely-modulated component signals mapped to the different positions in the plane and to modulate the coarsely-modulated component signals according to a dynamic attenuation profile, thereby providing finely-modulated component signals, wherein the second filter includes a dynamic gain equalizer comprising a diffractive light modulator, the diffractive light modulator including a plurality of elements configured to receive de-multiplexed component signals, wherein each element is controllable to selectively modulate each of the component signals according to the dynamic attenuation profile, wherein the first filter comprises a transparent glass lid with thin-film coatings covering the diffractive light modulator of the second filter.

2. The apparatus according to claim 1 wherein the diffractive light modulator comprises a grating light valve device.

3. The apparatus according to claim 1 wherein the first filter includes a Gain Flattening Filter.

4. The apparatus according to claim 3 wherein the Gain Flattening Filter is separate from the light modulator.

5. The apparatus according to claim 1 wherein the diffractive light modulator comprises a plurality of MEMS elements.

6. The apparatus according to claim 1 wherein the diffractive light modulator comprises a plurality of liquid crystal elements.

7. The apparatus of claim 1, wherein the de-multiplexing device comprises a bidirectional diffraction grating.

8. The apparatus of claim 1, wherein the de-multiplexing device comprises a prism.

9. The apparatus of claim 1, wherein the de-multiplexing device comprises a bidirectional de-multiplexor.

10. The apparatus of claim 1, further comprising a quarter wave plate positioned between the transform lens and the second filter.

\* \* \* \* \*